US006493562B2

(12) United States Patent
Yoshida et al.

(10) Patent No.: US 6,493,562 B2
(45) Date of Patent: *Dec. 10, 2002

(54) INFORMATION DELIVERY METHOD FOR VEHICULAR COMMUNICATION DEVICES

(75) Inventors: Ichiro Yoshida, Takahama (JP); Manabu Matsumoto, Handa (JP); Akira Torii, Chiryu (JP)

(73) Assignee: DENSO Corporation, Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,345

(22) Filed: Aug. 26, 1998

(65) Prior Publication Data

US 2002/0068555 A1 Jun. 6, 2002

(30) Foreign Application Priority Data

Aug. 26, 1997 (JP) ............................................ 9-229704

(51) Int. Cl.[7] ............................ H04B 7/26; H04L 1/18; G08G 1/09

(52) U.S. Cl. ........................ 455/517; 455/73; 455/3.01; 340/905; 714/748

(58) Field of Search ............................. 455/42, 60, 73, 455/517, 466, 3.01–3.06; 340/905, 928, 988, 990; 714/748, 749; 370/336, 337, 442, 216, 218, 355, 473

(56) References Cited

U.S. PATENT DOCUMENTS 3,740,669 A * 6/1973 Nahay ......................... 332/11
4,237,737 A * 12/1980 Nitadori ...................... 73/625
5,289,183 A * 2/1994 Hassett et al. .............. 340/905
5,311,516 A * 5/1994 Kuznicki et al. ...... 340/825.44
5,497,461 A * 3/1996 Matsumoto et al. ........ 714/748
5,594,490 A * 1/1997 Dawson et al. ................ 348/6
5,619,550 A * 4/1997 Averbuch et al. .......... 455/67.1
5,636,230 A * 6/1997 Marturano et al. ........... 371/32
5,734,780 A * 3/1998 Ichiura ........................ 386/46
5,784,000 A * 7/1998 Sato ...................... 340/825.44
5,784,006 A * 7/1998 Hechstein ................... 340/905
5,826,195 A * 10/1998 Westerlage et al. ......... 455/456
5,884,248 A * 3/1999 Hall ............................. 704/8
5,900,825 A * 5/1999 Pressel et al. .............. 340/905
5,918,156 A * 6/1999 Tanabe ...................... 455/12.1
6,014,708 A * 1/2000 Cannon et al. ............. 709/231
6,081,718 A * 6/2000 Ando et al. ................. 455/447

FOREIGN PATENT DOCUMENTS

| | | |
|---|---|---|
| JP | 49-65113 | 6/1974 |
| JP | 55-114046 | 9/1980 |
| JP | 4-111195 | 4/1992 |
| JP | 5-35933 | 2/1993 |
| JP | 6-85875 | 3/1994 |
| JP | 6-181449 | 6/1994 |
| JP | 6-243385 | 9/1994 |
| JP | 6-334591 | 12/1994 |
| JP | 7-212836 | 8/1995 |
| JP | 8-223081 | 8/1996 |
| JP | 9-172403 | 6/1997 |

* cited by examiner

*Primary Examiner*—Vivian Chin
*Assistant Examiner*—Duc Nguyen
(74) *Attorney, Agent, or Firm*—Harness, Dickey & Pierce, PLC

(57) ABSTRACT

A stationary communication device (SCD) is placed at a predetermined position to form a communication area covering vehicles traveling on a road. A vehicular communication device (VCD) is mounted on a vehicle for communicating with the SCD when the vehicle enters in the communication area. The SCD divides sound guidance data into a plurality of sound data blocks of predetermined communication frames and transmits the divided sound data blocks successively. The VCD receives the divided sound data blocks transmitted from the SCD, and requests the SCD to transmit specific sound data block again when the VCD fails to receive this specific sound data block, thereby issuing a sound guidance using the received sound data blocks including the specific sound data block transmitted again.

40 Claims, 15 Drawing Sheets

INFORMATION DELIVERY METHOD FOR VEHICULAR COMMUNICATION DEVICES

BACKGROUND OF THE INVENTION

The present invention relates to a radio communication system used for communications performed between a stationary communication device and vehicular communication devices, preferably employed in an automatic toll collection system, and relates to arrangements of the stationary communication device and the vehicular communication device used in this communication system.

An electronically controlled toll collecting system comprises a stationary communication device placed at a predetermined position of a tollgate for performing radio communications with vehicular communication devices mounted on vehicles passing through the tollgate. According to such an automatic toll collection system, collection of toll can be performed without toller's aid by exchanging data between the stationary communication device and the vehicular communication device.

This kind of electronically controlled toll collecting system usually provides a sound guidance (or voice guidance) for letting users know road information etc. To this end, the stationary communication device transmits sound data by radio wave. The vehicular communication device, mounted on a vehicle, receives the sound data transmitted from the stationary communication device and converts the received sound data into perceptible sounds through a speaker in a passenger compartment of the vehicle. Unexamined Japanese Patent Application No. 4-111195, published in 1992, discloses a conventional sound guidance system. For the radio communications performed between a stationary communication device and a vehicular communication device, a predetermined communication frame is used for transmitting communication data. In such a sound data transmission performed between the stationary communication device and the vehicular communication device, there is a possibility that a huge amount of sound data cannot be transmitted by a single communication frame. To solve this problem, it is preferable to use a plurality of separate communication frames for transmitting the massive sound data. However, the vehicular communication device may fail to receive all of the separate communication frames. This will result in an inaccurate sound guidance.

SUMMARY OF THE INVENTION

An object of the present invention is to provide a reliable radio communication system used for communications between a stationary communication device and vehicular communication devices. Another object of the present invention is to provide arrangements of the stationary communication device and the vehicular communication device used in this communication system.

In order to accomplish this and other related objects, a first aspect of the present invention provides a communication system comprising a stationary communication device placed at a predetermined position and forming a communication area covering vehicles traveling on a road, and at least one vehicular communication device mounted on a vehicle for communicating with the stationary communication device when the vehicle enters in the communication area. The stationary communication device divides sound guidance data into a plurality of sound data blocks of predetermined communication frames and transmits the divided sound data blocks successively. The vehicular communication device receives the divided sound data blocks transmitted from the stationary communication device, and requests the stationary communication device to transmit specific sound data block again when the vehicular communication device fails to receive this specific sound data block, thereby issuing a sound guidance using the received sound data blocks including the specific sound data block transmitted again.

Preferably, the vehicular communication device includes a sound data storage means for storing a predetermined number of sound data beforehand, and the stationary communication device transmits a designation signal in addition to the divided sound data blocks so that the vehicular communication device reads particular sound data from the sound data storage means in response to the designation signal. An index number may be attached to each sound data stored in the sound data storage means of the vehicular communication device. In this case, the stationary communication device transmits the designation signal including an index number corresponding to the particular sound data. To reduce a data transmission amount, it is effective to store frequently or commonly used sound guidance information in the sound data storage means of the vehicular communication device.

Preferably, the stationary communication device transmits display data paired with corresponding sound data blocks, and the vehicular communication device comprises a display unit for displaying contents of the sound data blocks based on the display data paired with the sound data blocks.

Preferably, the stationary communication device and the vehicular communication device comprise a bandwidth limiting circuit which limits a frequency band of communication data for modulating a carrier wave used in radio communications performed between the stationary communication device and the vehicular communication device. The bandwidth limiting circuit may convert a rectangular waveform signal of digital communication data into a sine waveform signal.

Preferably, sound data are compressed by sampling characteristic points together with corresponding time information to create a polynomial representing a time variation of the sound data.

Alternatively, a plurality of phonemes are prepared beforehand and a sound is created by multiplying respective phonemes with appropriate parameters and adding the multiplied phonemes.

It is preferable that the vehicular communication device analyze missing sound data based on already received sound data and selectively issue a sound guidance or a display guidance according to the analysis.

To check any missing sound data, it is preferable that the divided sound data blocks are referred by sequential numbers.

A second aspect of the present invention provides a vehicular communication device mounted on a vehicle for communicating with a stationary communication device, comprising a receiving means for receiving divided sound data blocks successively transmitted from the stationary communication device, a request means for requesting the stationary communication device to transmit specific sound data block again when the specific sound data block is not received successfully, and a sound generating means for generating a sound in a compartment of the vehicle based on the received sound data blocks including the specific sound data block transmitted again.

Preferably, the vehicular communication device further comprises a temporary data storage means for temporarily storing the divided sound data blocks successively transmitted from the stationary communication device, and the sound generating means issues the sound based on the sound data blocks stored in the temporary data storage means. The sound generating means has a function of reissuing the sound based on the sound data blocks stored in the temporary data storage means.

The vehicular communication device may further comprise a sound output terminal connectable to an external speaker provided in the compartment of the vehicle. Preferably, a built-in speaker of the vehicular communication device causes no sound when the external speaker is connected to the sound output terminal. The external speaker may be a speaker of an external audio component. In this case, a sound output switcher is provided between the sound output terminal and the external audio component for selecting sound data sent to the external speaker. For example, the sound output switcher comprises a sound signal detecting circuit for detecting a sound signal generated from the sound output terminal, and a switching unit for supplying the sound signal to the external speaker when the sound signal detecting circuit detects the sound signal. To listen to a sound guidance easily, a sound signal sent from the sound output terminal to the external speaker can be enlarged than a sound signal sent from the external audio component to the external speaker.

A third aspect of the present invention provides a stationary communication device placed at a predetermined position for forming a communication area to communicate with a vehicular communication device mounted on a vehicle entering in the communication area; comprising a sound data transmitting means for dividing sound guidance data into a plurality of sound data blocks of predetermined communication frames and transmitting the divided sound data blocks successively to the vehicular communication device, and a missing data transmitting a means for transmitting specific sound data block again in response to a request returned from the vehicular communication device that fails to receive this specific sound data block.

A fourth aspect of the present invention provides a communication system comprising a stationary communication device placed at a predetermined position and forming a communication area to transmit sound data to vehicles traveling on a road, and at least one vehicular communication device mounted on a vehicle for receiving the sound data transmitted from the stationary communication device when the vehicle enters in the communication area. The vehicular communication device includes a sound data storage means for storing a predetermined number of sound data beforehand, and the stationary communication device transmits a designation signal in addition to the sound data so that the vehicular communication device reads particular sound data from the sound data storage means in response to the designation signal.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
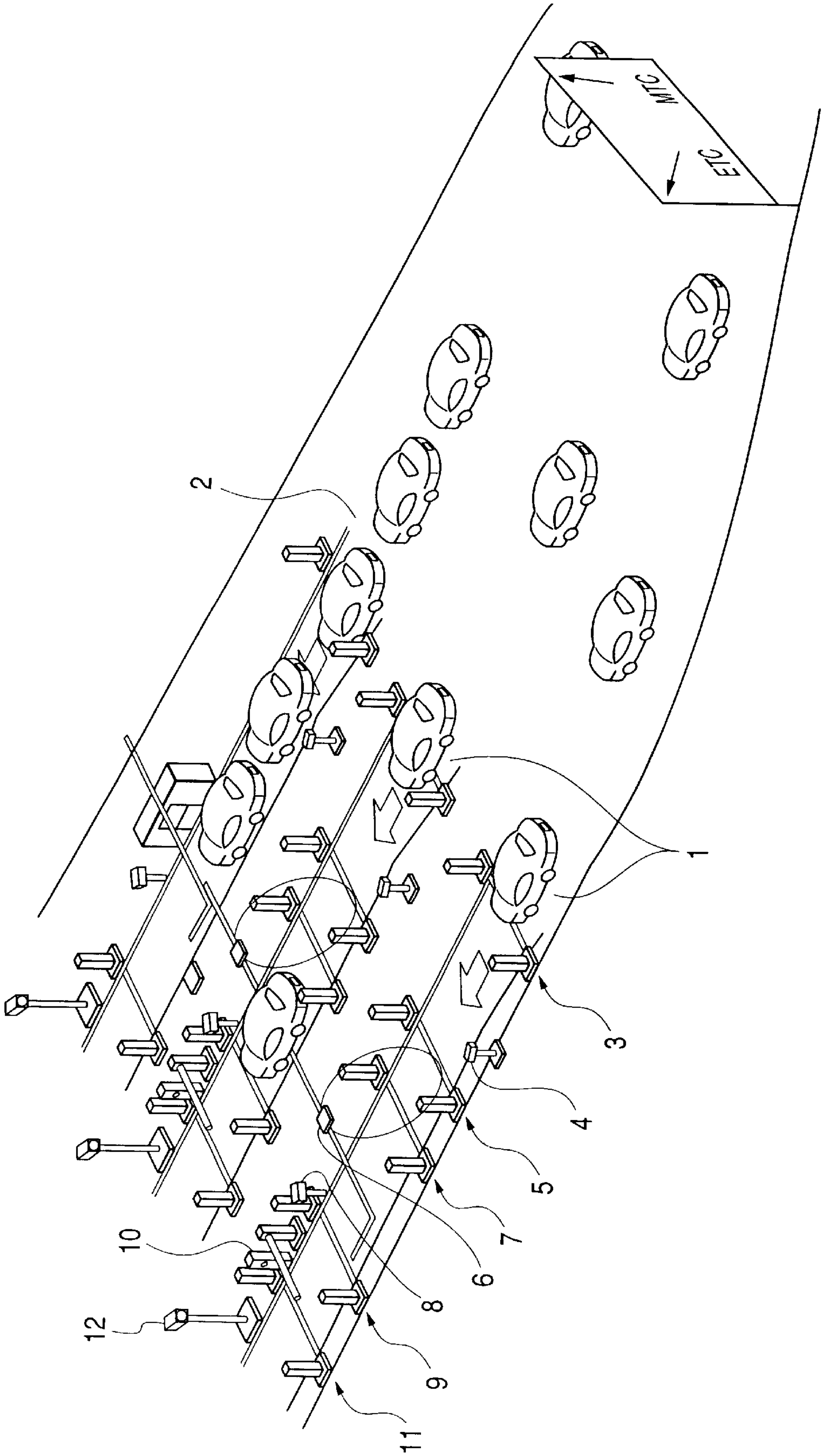
FIG. 1 is a perspective view showing an overall arrangement of an automatic toll collection system employed at a tollgate on a toll road.

Preferred embodiments of the present invention will be explained hereinafter with reference to attached drawings. Identical parts are denoted by the same reference numerals throughout the views.

First Embodiment

FIG. 1 shows an automatic toll collection system employed at a tollgate on a toll road (expressway). As shown in FIG. 1, the tollgate comprises ETC (electronically controlled toll collection) lane 1 and MTC (i.e., manually operated toll collection) lane 2. At the ETC lane 1, the collection of toll is automatically performed by a computer through the radio communications between a vehicular communication device VCD mounted on a vehicle and a stationary communication device SCD stationarily placed at a predetermined position of the tollgate. At the MTC lane 2, the collection of toll is manually performed by a toller in a conventionally well-known manner.

The ETC lane 1 has an approach pathway equipped with, from upstream to downstream, a vehicle type discriminator 3, an inlet monitor camera 4, an upstream vehicle sensor 5, an antenna 6 of the stationary communication device SCD, a downstream vehicle sensor 7, a charged toll indicator 8, a gate inlet sensor 9, a ticket distributor 10, a gate outlet sensor 11 and an exit monitor camera 12.

The vehicle type discriminator 3 discriminates a vehicle type of each vehicle advancing on the approach pathway of the ETC lane 1. The inlet monitor camera 4 reads a licence plate number of the vehicle. The stationary communication device SCD and the vehicular communication device VCD performs radio communications for automatic collection of toll based on the information exchanged between the stationary communication device SCD and the vehicular communication device VCD. Both the upstream vehicle sensor 5 and the downstream vehicle sensor 7 cooperatively determine the timing for the radio communications performed between the stationary communication device SCD and the vehicular communication device VCD. Both the gate inlet sensor 9 and the gate outlet sensor 11 cooperatively determine the timing for opening and closing the gate. The ticket distributor 10 issues a numbered ticket for a vehicle which is not equipped with a vehicular communication device VCD and mistakenly entered into the ECT lane 1. A driver receiving the numbered ticket is guided to advance his/her vehicle to an administration office for manual assistance by a toiler.

Figure 2:
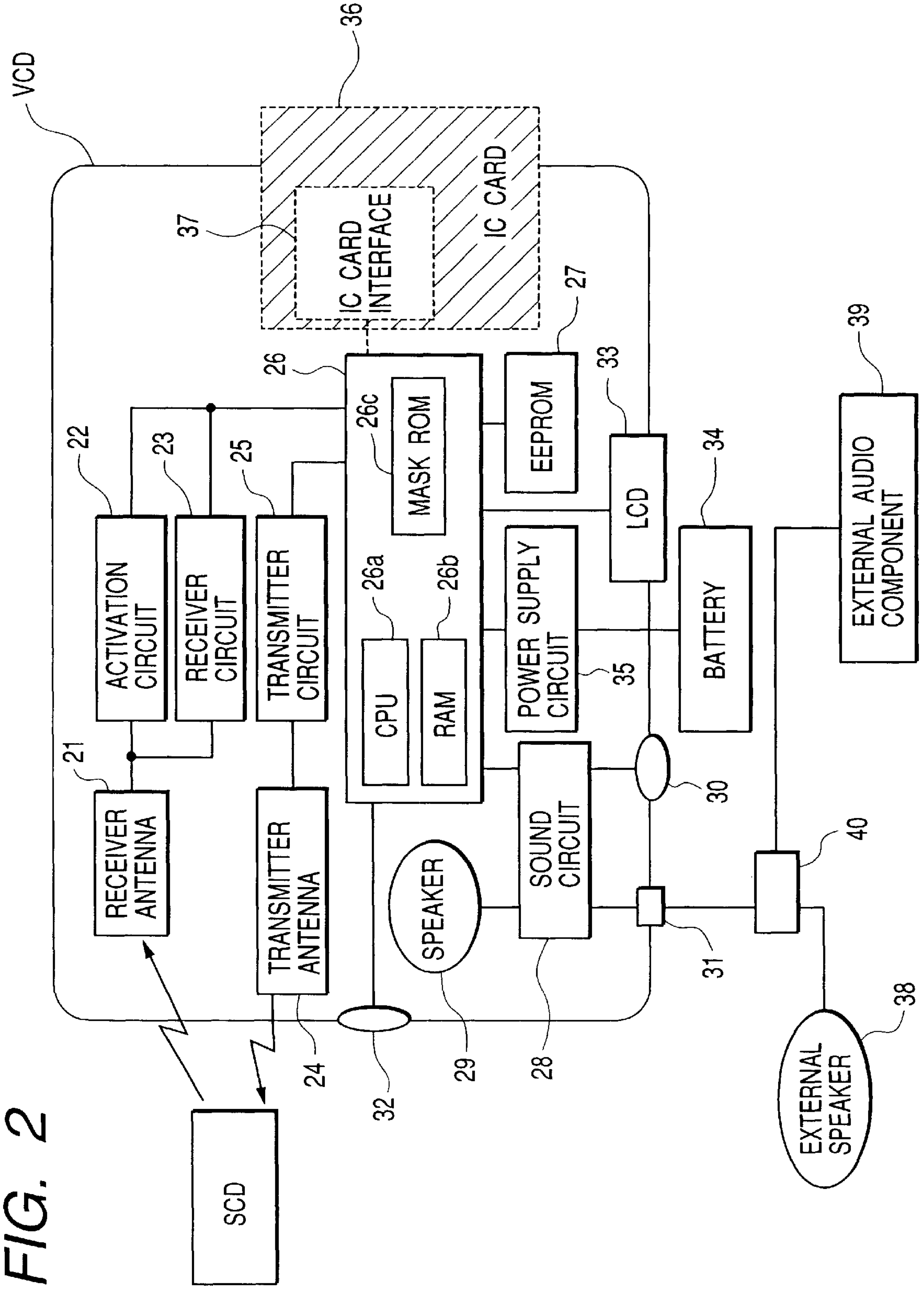
FIG. 2 is a schematic block diagram showing an arrangement of a vehicular communication device in accordance with a first embodiment of the present invention.

FIG. 2 shows a detailed arrangement of the vehicular communication device VCD. The vehicular communication device VCD comprises a receiver antenna 21, an activation circuit 22, a receiver circuit 23, a transmitter antenna 24, a transmitter circuit 25, a control circuit 26 performing various controls for the automatic toll collection, an EEPROM 27 storing various information including an ID number of the vehicular communication device VCD, a sound circuit 28 converting sound data into a sound signal, a built-in speaker 29 activated by the sound circuit 28, a volume adjuster 30 adjusting a sound volume, a sound output terminal 31 connecting the sound circuit 28 to an external speaker 38, a sound repeat button 32 depressed for reissuing the sound, a liquid crystal display (LCD) 33 serving as a display means for providing a required display, and a power supply circuit 35 supplying electric power from a battery 34 to various circuits in this vehicular communication device VCD.

The control circuit 26 comprises a CPU 26*a* executing processing for various controls, a RAM 26*b* serving as a temporary memory for storing temporary data including sound data during the processing performed in the CPU 26*a,* and a mask ROM 26*c* storing programs used in the CPC 26*a* for executing the various controls.

For convenience, the vehicular communication device VCD allows a user to use an IC card 36 for storing the data required for the toll collection. A card interface 37 is provided for communications between the IC card 36 and the CPU 26*a*.

The stationary communication device SCD forms a communication area. The activation circuit 22 detects an electric field of the communication area of the stationary communication device SCD, and activates the vehicular communication device VCD when the detected electric field exceeds a predetermined level. Upon activating the activation circuit 22, the vehicular communication device VCD can perform data communications with the stationary communication device SCD.

The receiver circuit 23 receives a radio wave (RF) signal transmitted from the stationary communication device SCD, and converts it into a digital signal. For example, the stationary communication device SCD transmits an ASK (amplitude-shift keying) signal. The receiver circuit 23 receives this ASK signal, and removes a carrier component therefrom to convert the received ASK signal into a digital signal which is sent to the CPU 26*a.*

The CPU 26*a* reads the received digital signal and checks whether the received data is an instruction or a numerical data based on an identification data involved in the received data. Furthermore, CPU 26*a* has a function of checking whether or not any error is involved in the received data as well as a function of abandoning or nullifying a received data when this is an already received data. Moreover, the CPU 26*a* has a function of checking whether or not the sound data are completely ready for generating sounds accurately. When the required sound data is perfectly ready, CPU 26*a* stores the sound data in the RAM 26*b* and sends a sound generating instruction to the sound circuit 28.

The sound circuit 28 reads the sound data stored in the RAM 26*b* in response to the sound generating instruction sent from the CPU 26*a,* and produces a sound signal based on the readout sound data. The built-in speaker 29 generates a sound in response to the sound signal sent from the sound circuit 28. The sound circuit 28 has a volume adjusting means for adjusting a sound level in response to a manipulation of the volume adjuster 30.

The external speaker 38 is provided as a spare speaker which is used when the built-in speaker 29 cannot attain a sufficient sound level in a traveling condition of the vehicle. To this end, the vehicular communication device VCD has the sound output terminal 31. When a jack of the external speaker 38 is connected to the sound output terminal 31, the external speaker 38 can produce sounds. In this case, it is possible to cause the built-in speaker 29 to produce no sound when the speaker jack is connected to the sound output terminal 31. The volume adjuster 30 can be used to adjust the volume of the external speaker 38.

According to this embodiment, the external speaker 38 is a speaker of an audio component 39. A sound output switcher 40 is provided between the sound output terminal 31 and the external audio component 39 to switch sound data sent to the external speaker 38.

Figure 3:
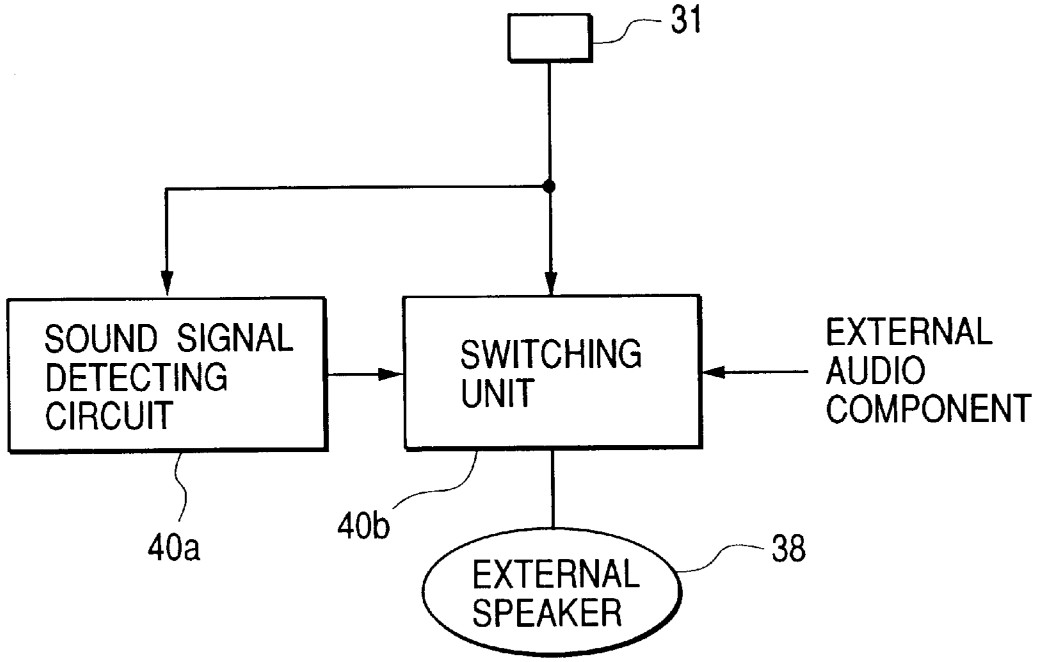
FIG. 3 is a block diagram showing a detailed arrangement of a sound output switcher shown in FIG. 2.

FIG. 3 shows a detailed arrangement of the sound output switcher 40. The sound output switcher 40 comprises a sound signal detecting circuit 40*a* which detects the sound signal generated from the sound output terminal 31 and a switching unit 40*b* which supplies the sound signal to the external speaker 38 when the sound signal detecting circuit 40*a* detects the sound signal. It is preferable that the vehicular communication device VCD generates a larger sound signal while the external audio component 39 generates a smaller sound signal when sound signals are sent from both the vehicular communication device VCD and the external audio component 39 to the external speaker 38. This arrangement makes it easy for the user to listen to the sound guidance sent from the vehicular communication device VCD.

The sound repeat button 32 is depressed for generating or issuing the sounds again. The sound repeat button 32 allows the user to listen to the sound guidance repetitively. When the sound repeat button 32 is depressed, the CPU 26*a* sends a sound generating instruction to the sound circuit 28. In response to the sound generating instruction, the sound circuit 28 restarts the sound guidance using the latest sound data stored in the RAM 26*b*. In this manner, the sound guidance can be repeated by depressing the sound repeat button 32.

The LCD 33 provides the display in a desired manner according to the processing of the CPU 26*a* or the data sent from the stationary communication device SCD. In this case, it is preferable that the EEPROM 27 stores various display data beforehand so that the stationary communication device SCD can designate a desirable display pattern or data from the EEPROM 27. This is effective to reduce the substantial amount of display data transmitted from the stationary communication device SCD.

In the data communications between the stationary communication device SCD and the vehicular communication device VCD, the data amount equivalent to 100 KB will be required for a sound guidance of several seconds. When the stationary communication device SCD has a slow data transmission speed, the sound guidance cannot be performed satisfactorily. To increase the communication speed, it is advantageous to use a carrier wave having a higher frequency. The carrier wave used in this embodiment has predetermined frequency bands, e.g., so-called ISM bands, of 915 MHz, 2.45 GHz and 5.8 GHz. The carrier wave is modulated by using data exceeding about 1 M bit/sec (1 Mbps) for obtaining a communication speed exceeding 1 Mbps.

Figure 4:
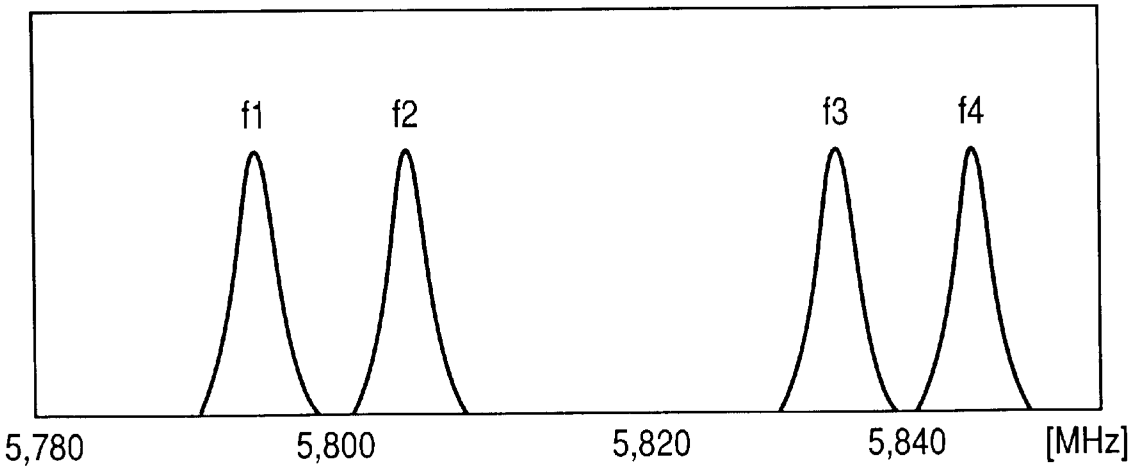
FIG. 4 is a graph showing frequency components of radio wave signals used in the communications performed between a stationary communication device and a vehicular communication device.

FIG. 4 shows radio-frequency components f1 to f4 in the frequency band around 5.8 GHz used in the radio communications between the vehicular communication device VCD and the stationary communication device SCD. The vehicular communication device VCD and the stationary communication device SCD use two frequency components, respectively. When the frequency component f1 is a transmission frequency component of the stationary communication device SCD, the frequency component f3 is a transmission frequency component of the vehicular communication device VCD. When the frequency component f2 is a transmission frequency component of the stationary communication device SCD, the frequency component f4 is a transmission frequency component of the vehicular communication device VCD. The receiver circuit 23 has a means for discriminating the transmission frequency of the stationary communication device SCD between f1 and f2. Each of the frequency components f1 to f4 has a band width of several MHz.

Figure 5:
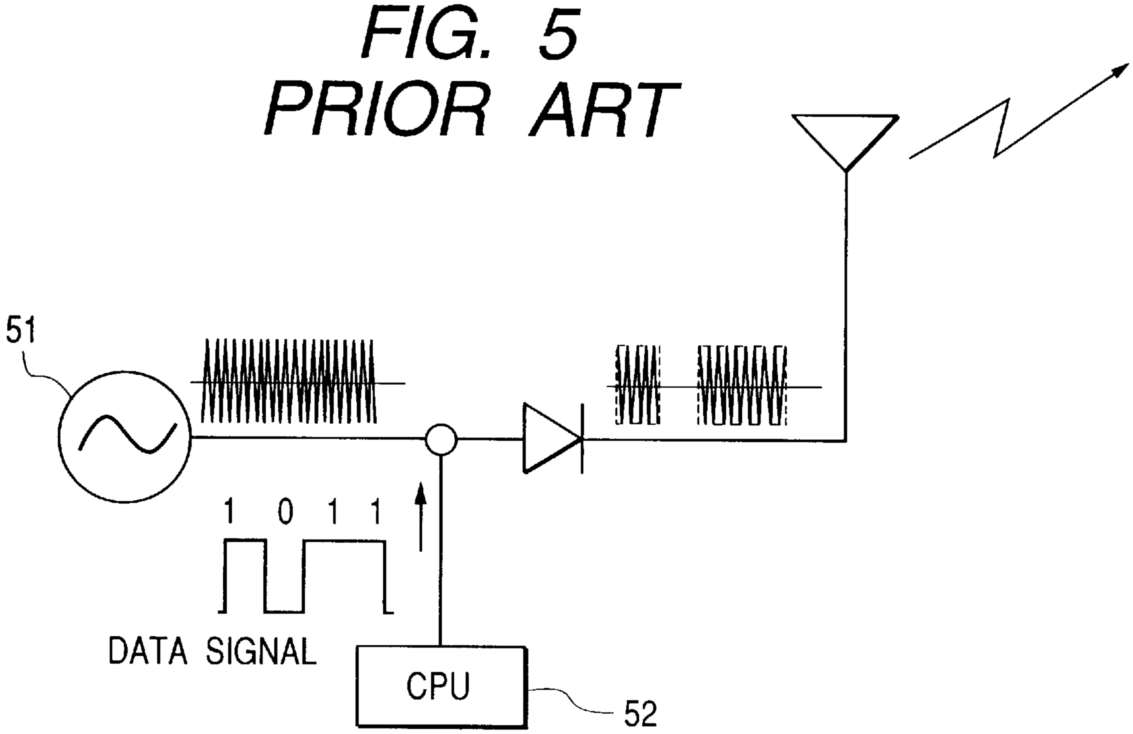
FIG. 5 PRIOR ART
FIG. 5 is a circuit diagram showing a conventional transmitter circuit used for the stationary communication device and the vehicular communication device.
Figure 6:
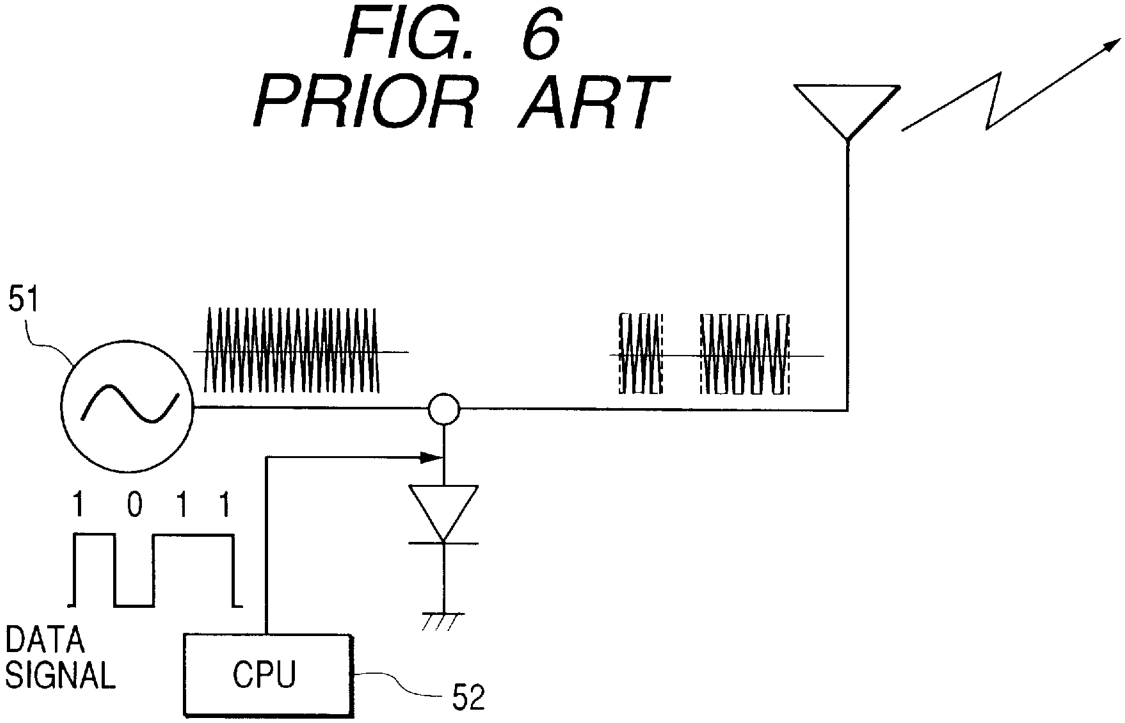
FIG. 6 PRIOR ART
FIG. 6 is a circuit diagram showing another conventional transmitter circuit used for the stationary communication device and the vehicular communication device.

FIGS. 5 and 6 show conventional transmitter circuits used in the communications between the stationary communication device SCD and the vehicular communication device VCD. A carrier wave source 51 generates a carrier wave, while a CPU 52 (equivalent to CPU 26*a* for the vehicular communication device VCD) generates a digital data signal having a rectangular waveform. The carrier wave generated from the carrier wave source 51 is modulated by the digital data signal generated from the CPU 52 (CPU 26*a*). According to these conventional methods, the rising and falling portions of the rectangular waveform signal involve high-frequency components. To avoid any interference between these high-frequency components, it is necessary to provide a wide frequency interval between two adjacent frequency components f1 and f2 or between f3 and f4.

Figure 7:
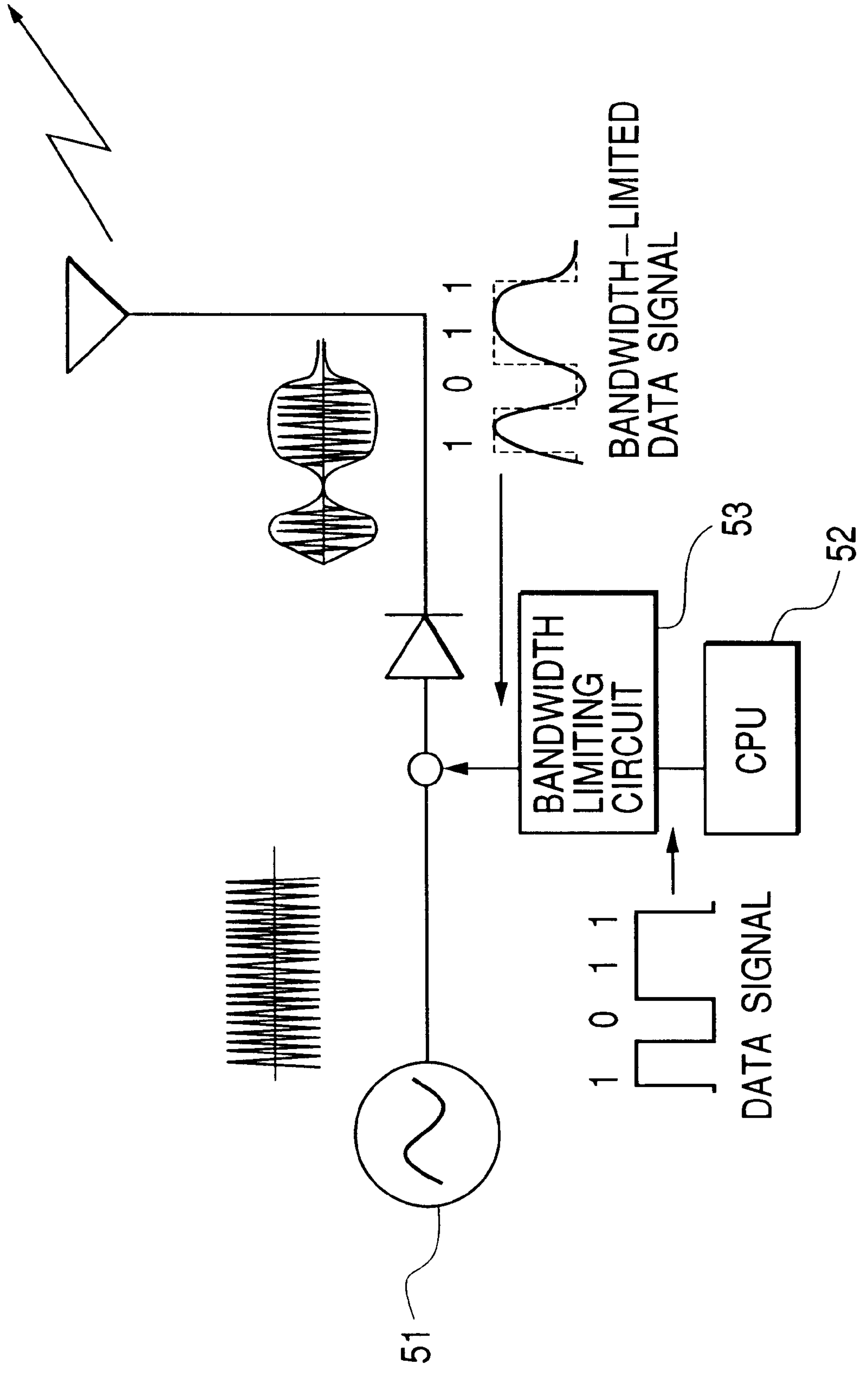
FIG. 7 is a circuit diagram showing a transmitter circuit used for the stationary communication device and the vehicular communication device in accordance with the first embodiment of the present invention.
Figure 8:
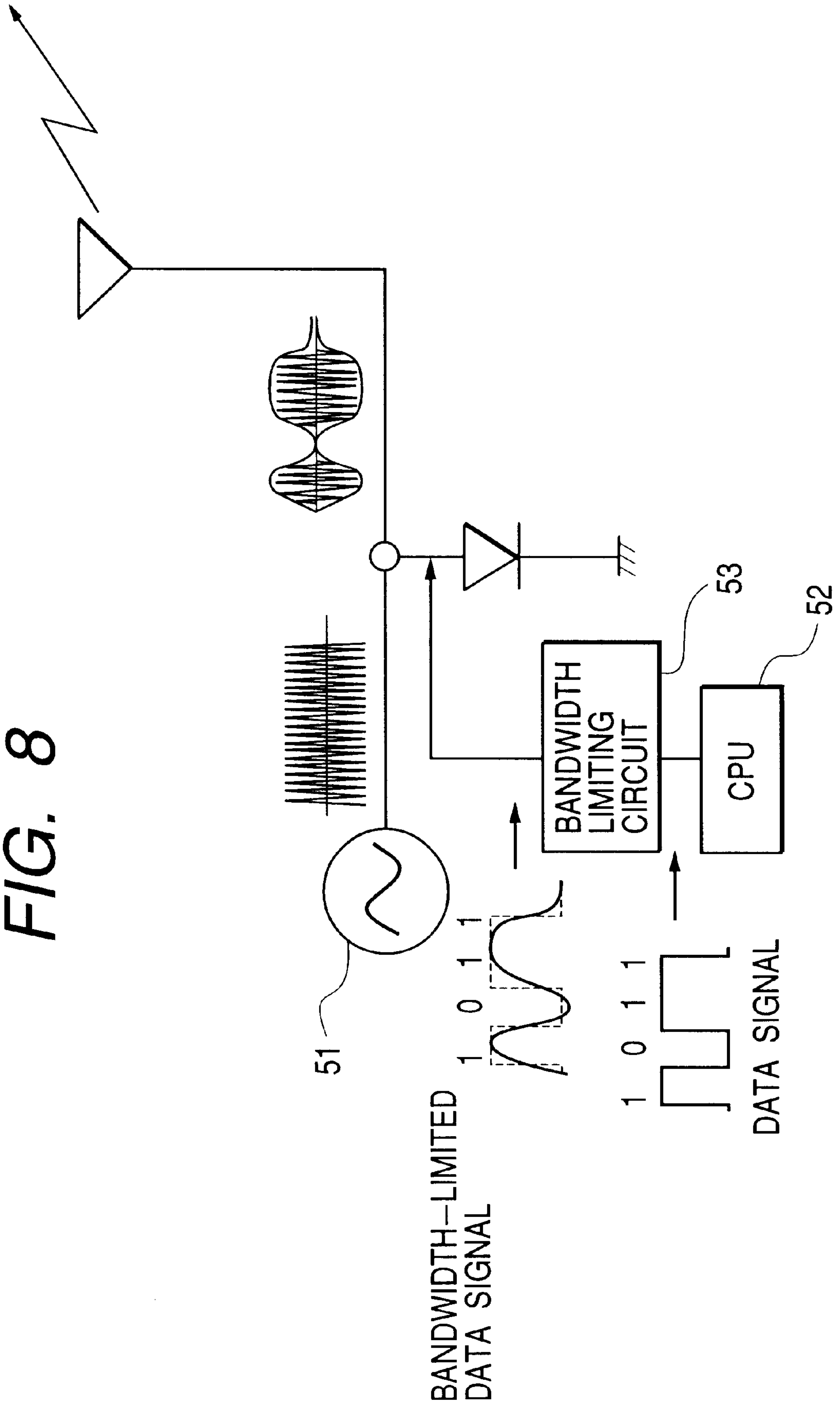
FIG. 8 is a circuit diagram showing another transmitter circuit used for the stationary communication device and the vehicular communication device in accordance with the first embodiment of the present invention.
Figure 9B:
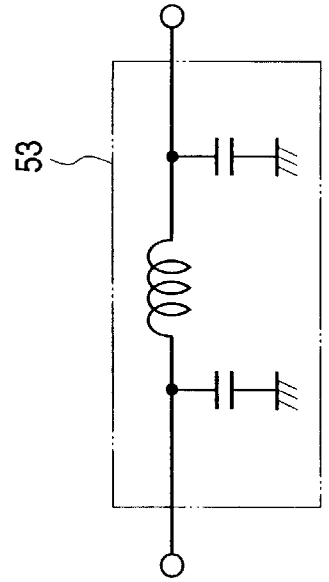
FIGS. 9A and 9B are circuit diagrams showing detailed arrangements of the bandwidth limiting circuit used in the transmitter circuit shown in FIG. 7 or 8.
Figure 9A:
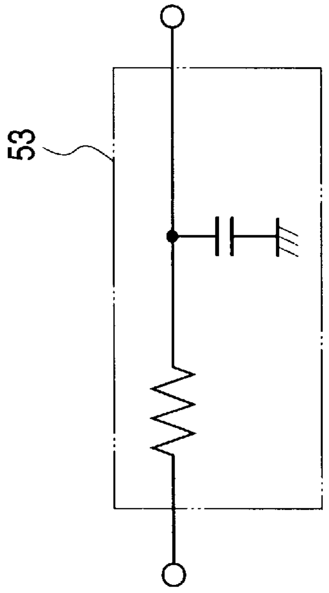

FIGS. 7 and 8 show transmitter circuits used in this embodiment. To suppress the bandwidth to the level of several MHz, the rectangular waveform signal produced from the CPU 52 enters into a bandwidth limiting circuit 53. The bandwidth limiting circuit 53 converts the rectangular waveform signal into a sine waveform signal. With this arrangement, the frequency band of communication data can be limited appropriately. The bandwidth limiting circuit 53 is basically a high-frequency band filter represented by a circuit arrangement shown in FIG. 9A comprising a resistor and a capacitor or by a circuit arrangement shown in FIG. 9B comprising a coil and capacitors. Furthermore, it becomes possible to arrange the bandwidth limiting circuit 53 by utilizing the frequency characteristics of an operational amplifier.

The bandwidth limiting circuit 53 cuts the high-frequency components of the digital data signal produced from the CPU 52. The output signal of the bandwidth limiting circuit 53 modulates the carrier wave. The transmission radio wave thus modulated by using the bandwidth limiting circuit 53 has gradual or moderate rising and falling portions compared with the ordinary modulation using the rectangular waveform signal. The frequency bandwidth is thus narrowed.

Figure 10:
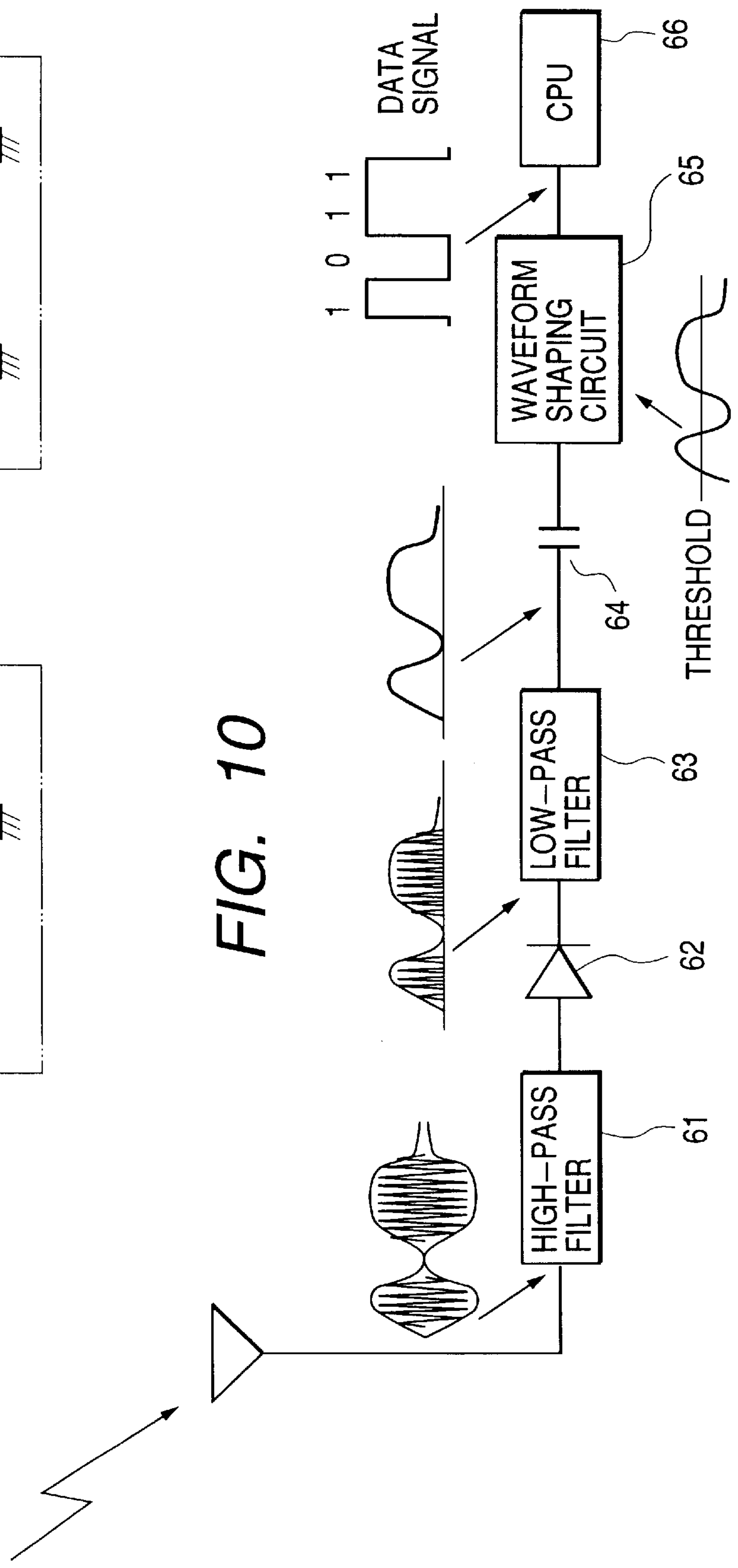
FIG. 10 is a schematic arrangement of a demodulation circuit used for demodulating data transmitted from the transmitter circuits shown in FIGS. 7 and 8.

FIG. 10 shows a demodulation circuit (i.e., the receiver circuit) used for restoring the received modulation waveform signal to the original data. The modulation waveform signal is first processed in a high-pass filter 61 and then half-wave rectified in a diode 62. Subsequently, the modulation waveform signal passes a low-pass filter 63 to take out the data signal involved in the modulation signal. Thereafter, the data signal is successively processed by a high-pass filter 64 and a waveform shaping circuit 65 having a predetermined threshold. Through these processing, the data signal is restored as a signal having an original rectangular waveform. Then, the restored data signal is amplified appropriately and sent to a CPU 66 (equivalent to CPU 26*a* for the vehicular communication device VCD).

With the- above-described circuit arrangement, it becomes possible to realize a high communication speed exceeding 1 Mbps with a narrow frequency band.

To ensure the transmission of sound data in a communication area formed by the stationary communication device SCD, it is necessary to form a sufficiently wide communication area. As one of method for widening the communication area, it is possible to increase the output of the radio wave transmitted from the antenna of the stationary communication device SCD. However, the output of the radio wave cannot be increased limitlessly. Accordingly, this embodiment adopts a data compression technique to realize a successful sound data transmission in a limited communication area.

Figure 11:
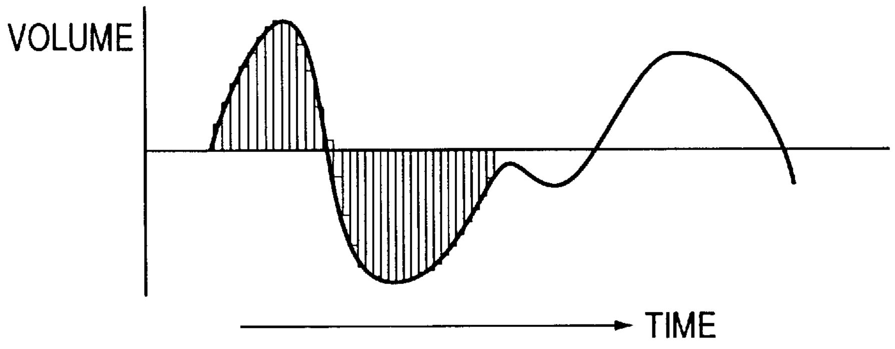
FIG. 11 is a view illustrating a conventional sound data compression method.

In general, sound data are defined as an amplitude variation with respect to an elapse of time. To perform the data compression, the sound data are obtained by sampling the amplitude varying as shown in FIG. 11. For a successful transmission, it is generally necessary to completely restore the transmission data to the original form after the data is transmitted from the stationary communication device SCD to the vehicular communication device VCD. Accordingly, the transmission data has a limited compression rate (i.e., a ratio of a data amount after compression to a data amount before compression). Meanwhile, containing distortions more or less in the sound guidance data will be acceptable when the sound guidance is audible for a driver or a passenger in a vehicle. Sufficiently compressing the sound guidance data is important when they are sent from the stationary communication device SCD to the vehicular communication device VCD even if they contain some distortions.

Figure 12:
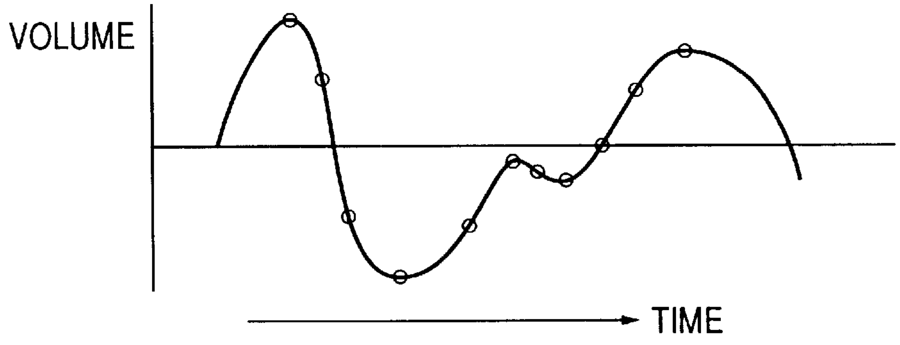
FIG. 12 is a view illustrating a sound data compression method used in the first embodiment of the present invention.

From the foregoing, as shown in FIG. 12, it is preferable to obtain the sound data by sampling a limited number of characteristic points as shown in FIG. 12. This is effective to reduce the substantial data amount compared with the sampling shown in FIG. 11. The sampling method shown in FIG. 12 requires time information corresponding to sampled data. A plurality of time and volume data thus sampled are used to create a polynomial of higher order which represents the time variation of sound data. A volume (i.e., a sound level) at an arbitrary time is calculated by referring the created polynomial. Thus, the sound data can be reproduced satisfactorily. This data compression method is similar to a method used in an adaptive differential pulse code modulation (ADPCM) for a telephone sound waveform coding.

Figure 13:
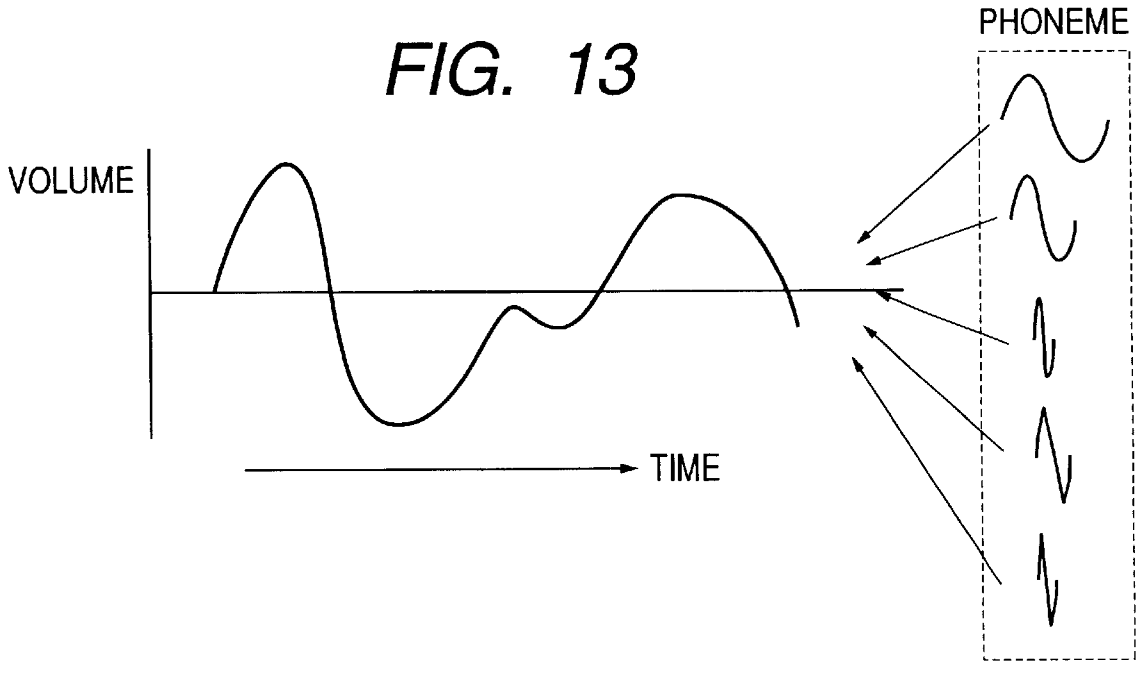
FIG. 13 is a view illustrating another sound data compression method used in the first embodiment of the present invention.

FIG. 13 shows another data compression method. According to this method, a plurality of phonemes are prepared beforehand. To create a sound, respective phonemes are multiplied with appropriate parameters and added (linear connection) to produce synthesized sounds. In this case, appropriately setting the parameters multiplied to the phonemes is effective to minimize the waveform distortions and optimize an acoustic S/N ratio. This method is similar to a multipath method employed in a portable telephone system or a so-called code excited linear prediction (CELP) method.

Furthermore, it is possible to use a so-called MPEG method for a sound data compression algorithm. This is similar to the above-described method of reconstructing the sound data as a combination of fundamental waveforms. To reduce the data amount, it is further possible to use a vector quantization method which transmits the data relating to the size of each fundamental waveform.

The sound data compressed by the above-described data compression method and sent from the stationary communication device SCD are received by the vehicular communication device VCD and restored to the original sound data.

Figure 14:
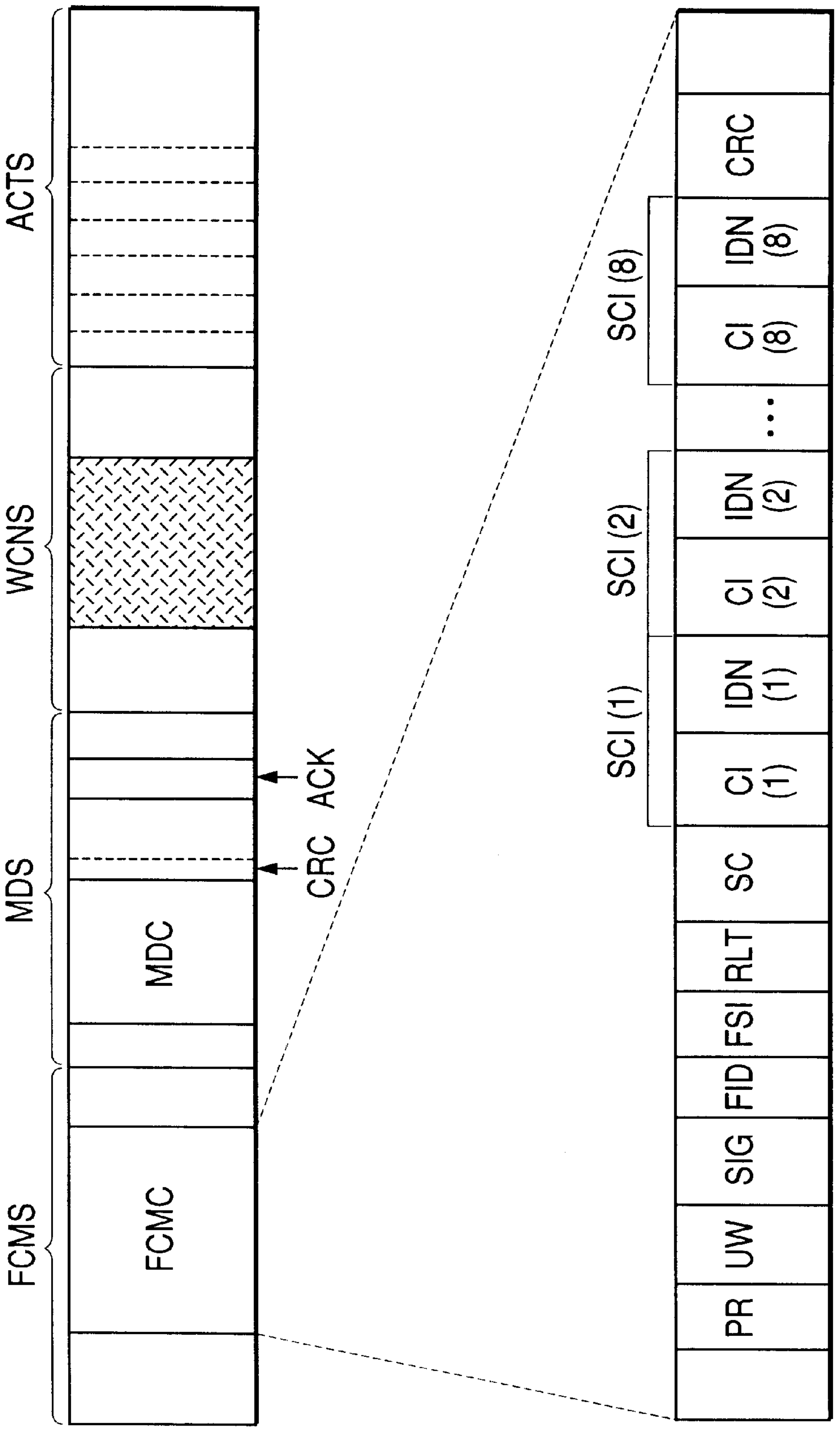
FIG. 14 is a view showing a data frame arrangement used in the radio communications between the stationary communication device and the vehicular communication device.

Next, the radio communications performed between the stationary communication device SCD and the vehicular communication device VCD will be explained in a greater detail. FIG. 14 shows a data frame arrangement used in the radio communications between the stationary communication device SCD and the vehicular communication device VCD.

A total of four compulsory communication frames, i.e., a frame control message slot (FCMS), a message data slot (MDS), an identification code slot (WCNS) and an activation slot (ACTS), are used in the communications between the stationary communication device SCD and the vehicular communication device VCD.

The frame control message slot (FCMS) is a slot used for transmitting a frame control information from the stationary communication device SCD to a plurality of vehicles. Each frame includes one frame control message slot (FCMS) at a head position of the frame.

The stationary communication device SCD transmits FCMC to the vehicular communication device VCD by using FCMS. The FCMC comprises various data of PR, UW, SIG, FID, FSI, RLT, SC, SCI(I), and CRC.

PR is a preamble. UW is a unique word representing a frame recognition data put on the head of the frame. SIG is a transmission channel control field. SIG comprises PVI designating a protocol version, FTI designating a communication frequency, CCZ designating a layout type (i.e., a connection type or a single type) of the stationary communication device, TRI designating the position of the connected stationary communication device, TDI designating the presence of a time divisional control, and ATI designating a communication area size.

FID is an identification number field (i.e., stationary communication device ID). FSI is a frame configuration information field. FSI comprises CM designating the communication mode between full-duplex and half-duplex and SLN setting a separate slot number. RLT is a release timer information field indicating a timer value set in an application layer.

SC is a service application information field indicating a registered ID of an application available from the stationary communication device. SCI (I) is a slot control information field that comprises CI (control information subfield) designating a slot type (MDS, ACTS, WCNS) and IDN (link address subfield). For MDS, the vehicular communication device ID is stored in IDN. The value of I in SCI (I) is set by SLN of FSI. CRC indicates a CRC calculation result of FCMC other than PR and UW.

The message data slot (MDS) comprises a slot (MDC) used for data transmission and reception and an acknowledgment channel (ACKC). The communication data used in the communications between the stationary communication device and the vehicular communication device are set in MDS. For example, MDS includes later-described sound data or an index number designating the sound data as explained in a second embodiment. ACKC stores the information relating to whether or not the reception was successful.

The identification code slot (WCNS) is a slot used for discriminating the type of the vehicular communication device. In other words, WCNS identifies each vehicular communication device since the vehicular communication device can be used for various purposes, such as toll collection, automatic traveling, transceiver, and emergency vehicle communication.

The activation slot (ACTS) is a slot used for linking the stationary communication device with each vehicular communication device. This secures the communication connection between the stationary communication device and the vehicular communication device. A plurality of channels are set in this slot. A signal including a vehicular communication device ID is sent to a channel of ACTS. Any vehicular communication device, entering in the communication area of the stationary communication device, sends its ID to the channel of ACTS to notify its presence to the stationary communication device.

Next, details of the radio communication processing performed between the stationary communication device and the vehicular communication device will be explained.

Figure 15:
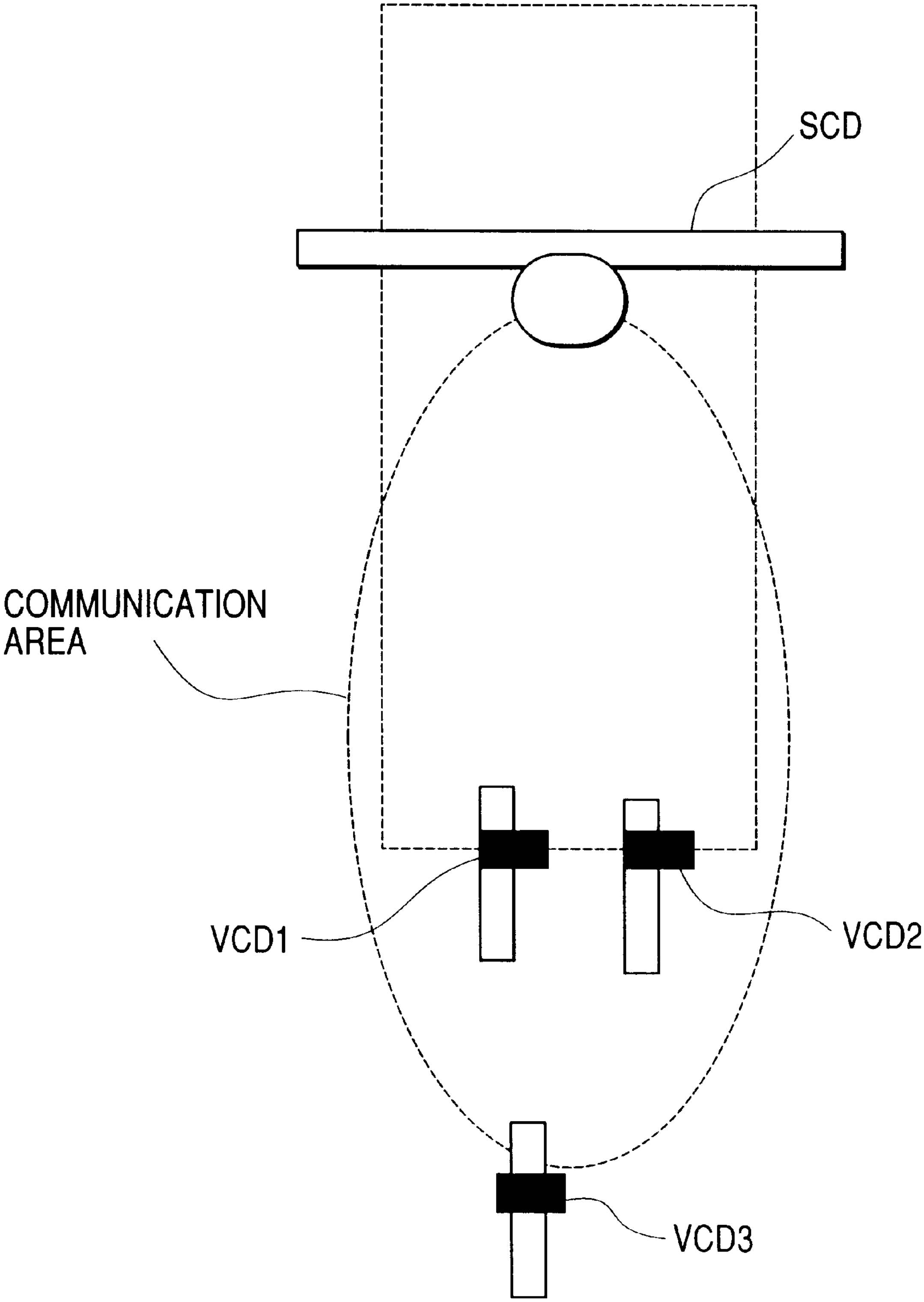
FIG. 15 is a view illustrating a positional relationship between the stationary communication device and a plurality of vehicular communication devices.

As shown in FIG. 15, it is assumed that a first vehicular communication device VCD1 and a second vehicular communication device VCD2 advance side by side on the approach pathway of the ETC lane 1 and are positioned ahead of a third vehicular communication device VCD3. In this case, both the first vehicular communication device VCD1 and the second vehicular communication device VCD2 simultaneously enter the communication area of the stationary communication device SCD. Each of the first vehicular communication device VCD1 and the second vehicular communication device VCD2 detects an electric field of the communication area and recognizes the communication area based on the intensity of the electric field. Each vehicular communication device VCD detects the frequency of a received radio wave and selects an appropriate frequency band used for transmitting data to the stationary communication device SCD.

Figure 16:
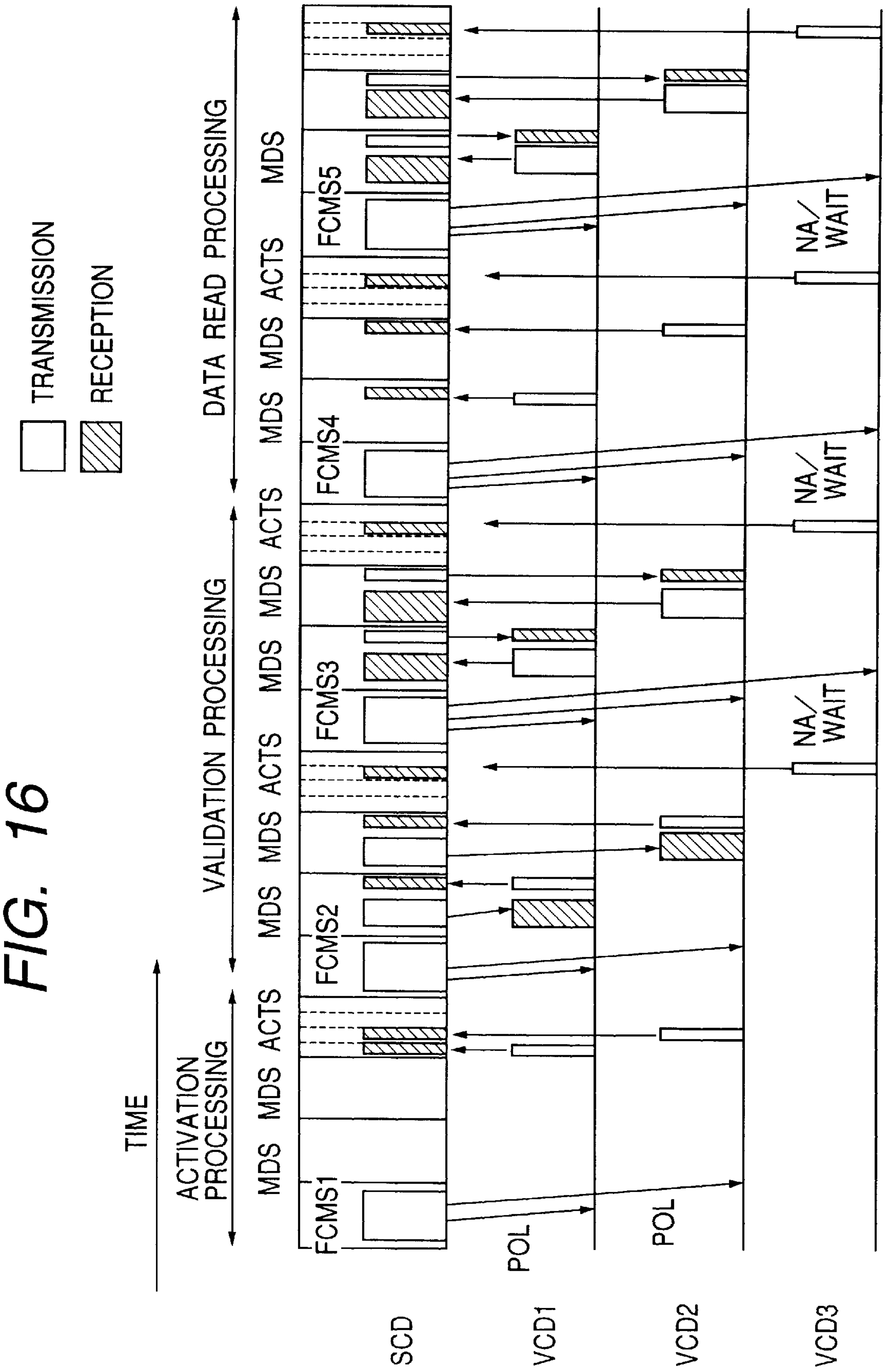
FIGS. 16 and 17 are schematic views showing the radio communications performed between the stationary communication device and the vehicular communication devices.
Figure 17:
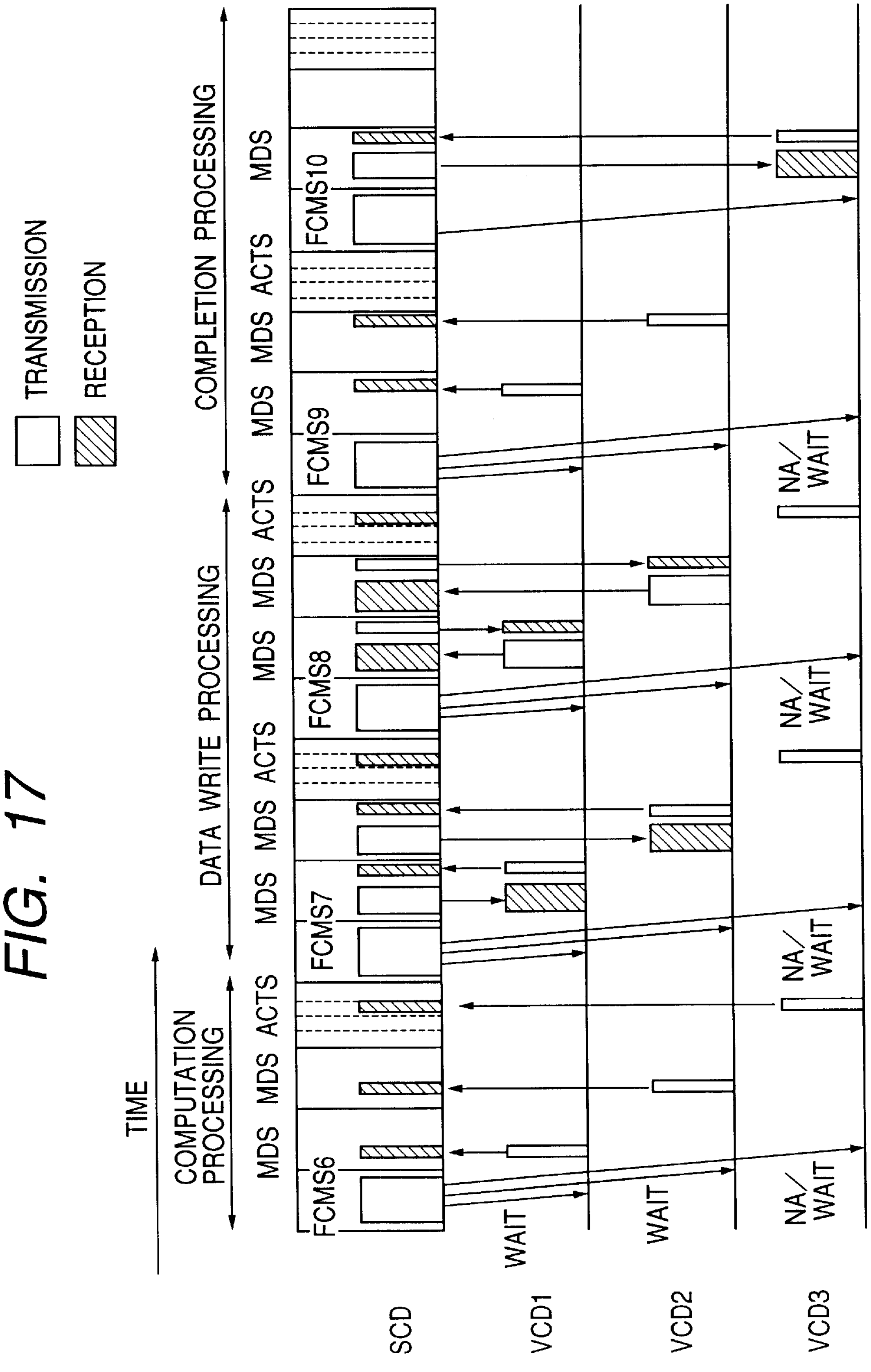

FIGS. 16 and 17 schematically show the radio communications performed for collecting the toll between the stationary communication device SCD and the vehicular communication device VCD. The stationary communication device SCD, as shown in FIG. 16, transmits the FCMS signal periodically. The FCMS signal includes an address signal POL addressing the vehicular communication device VCD.

The vehicular communication device VCD, when it receives the FCMS1, transmits a response signal including its ID within a period of time of ACTS set by the stationary communication device SCD.

When the stationary communication device SCD receives the response signal from the vehicular communication device VCD, the stationary communication device SCD transmits the SC(I) of FCMS to this vehicular communication device VCD. SC(I) includes a suggestion about MDS to which the ACK signal is returned. According to FIGS. 16 and 17, the stationary communication device SCD allocates MDS1 and MDS2 to the first vehicular communication device VCD1 and the second vehicular communication device VCD2, respectively.

The stationary communication device SCD performs validation processing with respect to the vehicular communication device VCD which returned the response signal. In this validation processing, the stationary communication device SCD transmits a data read instruction to the first vehicular communication device VCD1 and the second vehicular communication device VCD2 to read out data required for performing the validation processing. Each vehicular communication device VCD returns a confirmation signal ACK when it received the data read instruction successfully. In the next communication frame, the stationary communication device SCD receives the validation data from each of the first vehicular communication device VCD1 and the second vehicular communication device VCD2. The stationary communication device SCD returns a confirmation signal ACK when it received the validation data successfully.

Although not explained in every processing described hereinafter, a confirmation signal ACK is returned in the same manner from a receiver side to a transmitter side evert time data is received successfully.

When the validation processing is over, the stationary communication device SCD performs data read processing required for the collection of toll. In this data read processing, the stationary communication device SCD transmits a data read instruction to the first vehicular communication device VCD1 and the second vehicular communication device VCD2. Then, in the next communication frame, the stationary communication device SCD receives the required toll collection data from the first vehicular communication device VCD1 and the second vehicular communication device VCD2.

Next, the stationary communication device SCD performs computations for calculating a required toll amount and the balance. During this computation period, the stationary communication device SCD transmits a processing wait signal WAIT to the first vehicular communication device VCD1 and the second vehicular communication device VCD2 as shown in FIG. 17.

When the computation processing is over, the stationary communication device SCD performs data write processing. In this data write processing, the stationary communication device SCD transmits a data write instruction to both the first vehicular communication device VCD1 and the second vehicular communication device VCD2. The first vehicular communication device VCD1 and the second vehicular communication device VCD2 respectively write data in response to this data write instruction. Then, in a later communication frame, the stationary communication device SCD receives a write completion signal from the first vehicular communication device VCD1 and the second vehicular communication device VCD2.

Upon receiving the write completion signal, the automatic toll collection processing is finished. The stationary communication device SCD transmits a processing completion signal to the first vehicular communication device VCD1 and the second vehicular communication device VCD2.

According to this embodiment, the stationary communication device SCD transmits a communication disable signal NA/WAIT to the third vehicular communication device VCD3 during a time the stationary communication device SCD is engaged with the first vehicular communication device VCD1 and the second vehicular communication device VCD2 for the toll collection processing. After finishing the toll collection processing for the first vehicular communication device VCD1 and the second vehicular communication device VCD2, the stationary communication device SCD performs the toll collection processing for the third vehicular communication device VCD3.

Next, details of sound data transmission processing will be explained. The sound data is transmitted from the stationary communication device SCD to each vehicular communication device VCD to perform a sound guidance.

Transmission of sound data is performed based on the communication using the above-described communication frame sent from the stationary communication device SCD to the vehicular communication device VCD by radio wave. However, the sound data is huge. The communication frame cannot transmit all of the sound data at time. Hence, the stationary communication device SCD divides the sound data into a plurality of communication frames and transmits these separate communication frames successively. Each vehicular communication device VCD receives the divided sound data carried by separate communication frames and temporarily stores them in the RAM 26*b*. After the transmission of the sound data is completed, the sound data stored in the RAM 26*b* are reconstructed to generate sounds for guidance.

Figure 18:
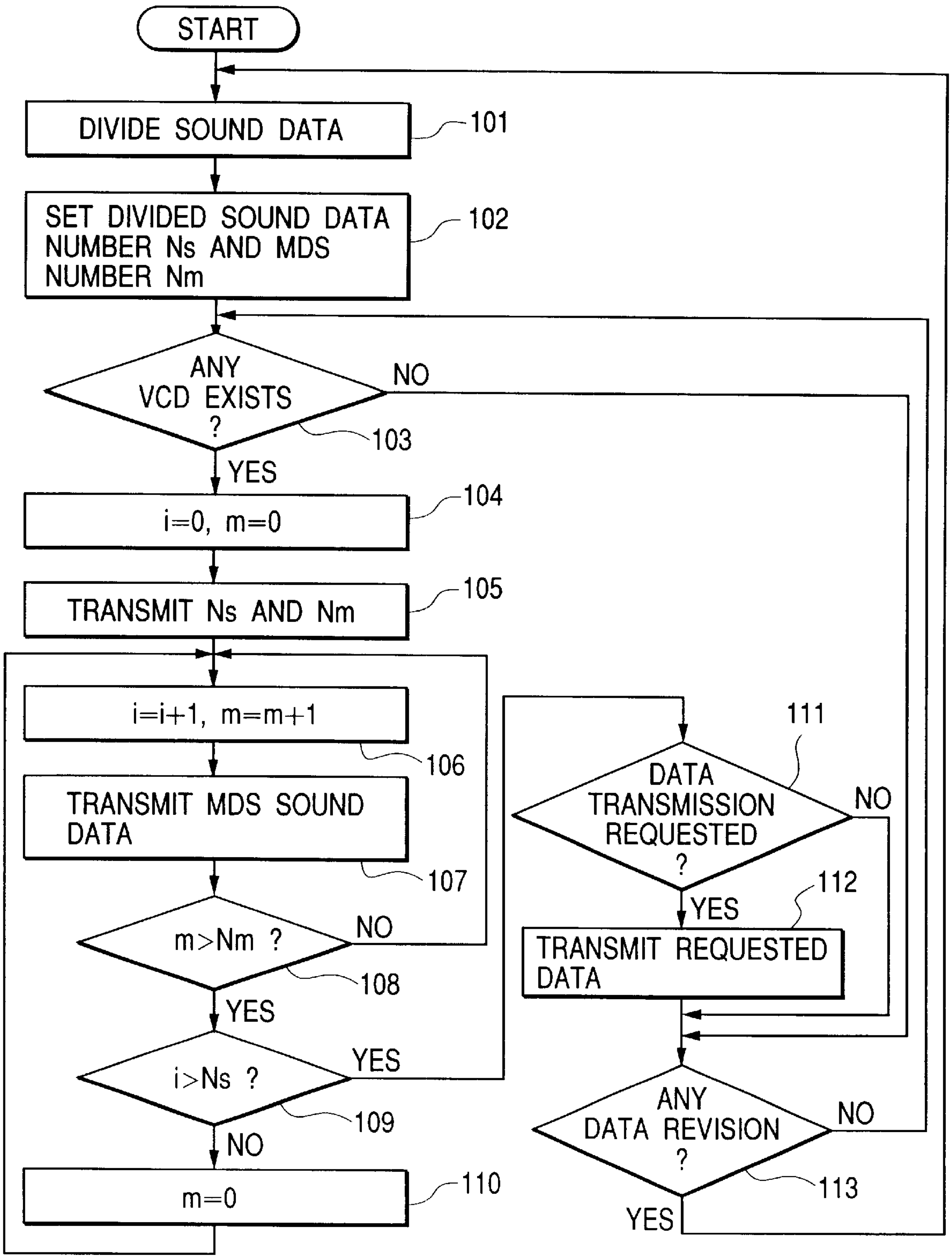
FIG. 18 is a flowchart showing sound data transmission processing performed in the the stationary communication device.

FIG. 18 shows details of the sound data transmission processing performed in the stationary communication device SCD. The stationary communication device SCD periodically receives sound data sent from an administration center (not shown) that administrates the traffic condition in a concentrated manner. The stationary communication device SCD divides or splits the received sound data into a plurality of data blocks each having a data length transmissible from the stationary communication device SCD to the vehicular communication device VCD at a time (Step 101). Then, both a divided sound data number Ns and a MDS number Nm are set (Step 102). The divided sound data number Ns represents a total number of the divided sound data blocks. The MDS number Nm represents a total number of MDS used for the sound data transmission. More specifically, Nm represents the number of MDS per communication frame used for transmitting the divided sound data. Thus, the data transmission is repeated Ns/Nm times for completing the transmission of all the sound data.

Accordingly, the stationary communication device SCD judges whether or not any vehicular communication device VCD enters in the communication area (Step 103). This judgement is performed by checking a response signal including the vehicular communication device ID received within the period of time of ACTS set by the stationary communication device SCD and then performing the validation processing as explained in the foregoing description.

When any vehicular communication device VCD newly enters in the communication area, both Ns counter value "i" and MDS counter value "m" are initialized (i.e., i=0 and m=0 as shown in Step 104). Subsequently, the newly entered vehicular communication device VCD is notified that the transmission of sound data will be performed by the divided sound data number Ns and the MDS number Nm (Step 105). Namely, the sound data is divided into Ns blocks. The divided sound data blocks are transmitted by using MDS of a total of Nm.

Thereafter, the Ns counter value "i" and the MDS counter value "m" are incremented by 1, respectively (Step 106). Then, the MDS sound data are transmitted (Step 107). In this MDS sound data transmission, a total of m MDS are used for the first m divided sound data. Sequential numbers, each indicating a serial number of the divided sound data, are set so as to correspond to the Ns counter value "i".

A judgement is made to check whether or not "m" is larger than Nm (Step 108). When "m" is not lager than Nm (i.e., NO in Step 108), the control flow returns to the step 106 to repeat the steps 106 through 108. Next, another judgement is made to check whether or not "i" is larger than Ns (Step 109). When "i" is not larger than Ns (i.e., NO in Step 109), the MDS counter value "m" is initialized (i.e., m=0 in step 110) to restart the above-described processing of steps 106 through 109 for transmitting the next m divided sound data blocks together with their sequential numbers. This procedure is repeated until the Ns counter value "i" exceeds Ns (i.e., YES in Step 109).

When the Ns counter value "i" exceeds Ns (i.e., YES in step 109), a judgement is made to check whether or not a transmission request has arrived from any vehicular communication device VCD due to shortage of the sound data to be transmitted (Step 111). When no transmission request is present (i.e., NO in Step 111), it is next judged whether or not any revision exists about the sound data transmitted from the administration center (Step 113). When no revision exists (i.e., NO in step 113), the control flow returns to Step 103 to perform the transmission of already stored sound data. When any revision exits (i.e., YES in step 113), the control flow returns to Step 101 to restart the processing of steps 101 through 113 based on the revised sound data.

If any transmission request is present (i.e., YES in Step 111), the stationary communication device SCD sets the divided sound data designated by the transmission request in MDS and transmits it to the corresponding vehicular communication device VCD (Step 112).

Figure 19:
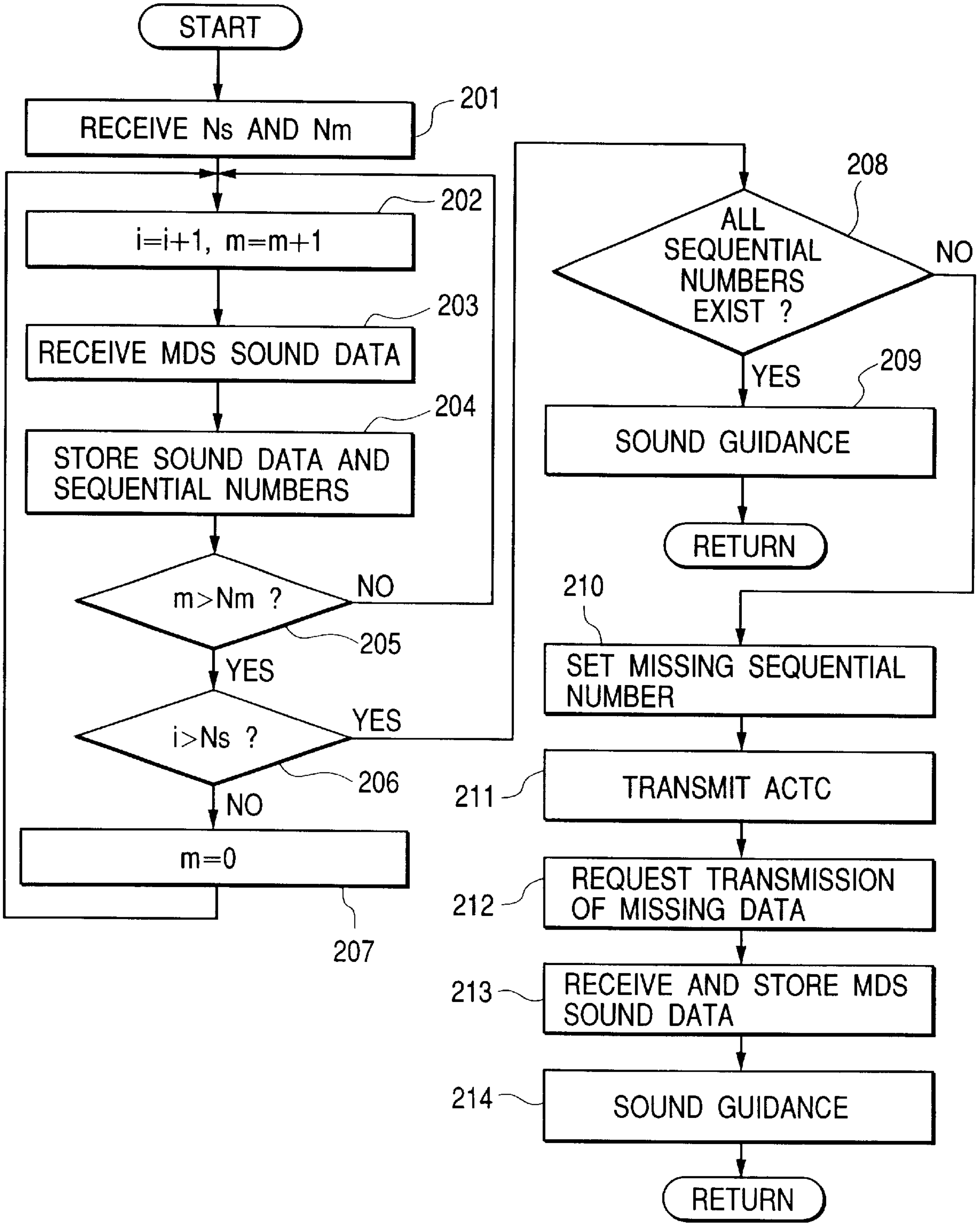
FIG. 19 is a flowchart showing sound data reception processing performed in each vehicular communication device.

FIG. 19 shows details of sound data reception processing performed in the vehicular communication device VCD.

Each vehicular communication device VCD initializes the Ns counter value "i" and the MDS counter value "m" (i.e., i=0 and m=0). Then, the vehicular communication device VCD receives the notice sent from the stationary communication device SCD notifying that the sound data is divided into Ns blocks and transmitted by using a total of m MDS (Step 201). Thereafter, the Ns counter value "i" and the MDS counter value "m" are incremented by 1, respectively (Step 202). Then, the MDS sound data are received (Step 203). Through this MDS sound data reception, the divided sound data set in the m MDS and their sequential numbers are received successively. The received sound data and their sequential numbers are stored in the RAM 26*b* temporarily (Step 204).

A judgement is made to check whether or not "m" is larger than Nm (Step 205). When "m" is not larger than Nm (i.e., NO in Step 205), the control flow returns to the step 202 to repeat the steps 202 through 204. Next, another judgement is made to check whether or not "i" is larger than Ns (Step 206). When "i" is not larger than Ns (i.e., NO in Step 206), the MDS counter value "m" is initialized (i.e., m=0 in step 207) to restart the above-described processing of steps 202 through 206 for receiving the next m divided sound data blocks together with their sequential numbers and storing the received data in the RAM 26*b*. This procedure is repeated until the Ns counter value "i" exceeds Ns.

When the Ns counter value "i" exceeds Ns (i.e., YES in Step 206), a judgement is made to check whether or not all of (i.e., a total of Ns) sequential numbers are stored (Step 208). When all of the sequential numbers exist (i.e., YES in Step 208), a sound generating instruction is sent to the sound circuit 28 (Step 209). In response to the sound generating instruction, the sound circuit 28 reads out all of the divided sound data blocks stored in the RAM 26*b* and reconstructs the readout sound data to issue a sound (or voice) guidance. The created sound guidance is output through the built-in speaker 29 (or the external speaker 38).

When at least one of the sequential numbers is missing (i.e., NO in Step 208), the control flow proceeds to Step 210 to acquire the missing sound data. More specifically, the sequential number corresponding to each missing sound data block is set. Next, an ACTC transmission is performed for initiating the communication with the stationary communication device SCD (Step 211). The vehicular communication device VCD sends a transmission request to the stationary communication device SCD (Step 212). In response to this transmission request, the stationary communication device SCD resends the divided sound data block designated by the sequential number notified through the ACTC transmission. As described in the foregoing description, the requested divided sound data block is set in MDS and sent to the vehicular communication device VCD.

The vehicular communication device VCD receives the MDS sound data re-transmitted from the stationary communication device SCD and stores them in a predetermined memory region corresponding to the sequential number of the missing data (Step 213). Then, in the same manner as Step 209, a sound guidance is issued based on all of sound data thus received (Step 214).

As explained above, according to the first embodiment, the stationary communication device divides the sound guidance data into a plurality of sound data blocks of predetermined communication frames and transmits the divided sound data blocks successively. The vehicular communication device receives the divided sound data blocks successively, and issues the sound guidance in a passenger compartment based on the received divided sound data. Accordingly, huge sound data can be transmitted effectively to the vehicular communication device by using a plurality of communication frames. When the vehicular communication device failed to receive all of divided sound data blocks, the vehicular communication device requests the stationary communication device to resend the missing sound data block. The stationary communication device re-transmits the missing sound data block. Thus, the vehicular communication device can surely receive all of sound data required for the sound guidance.

Second Embodiment

In addition to the arrangement of the first embodiment, the second embodiment comprises a sound data storage provided in the vehicular communication device VCD for storing predetermined sound data that are frequently or commonly used. The stationary communication device SCD can transmit a signal designating particular sound data stored in the vehicular communication device VCD. Thus, the sound guidance can be performed by using the sound data transmitted from the stationary communication device SCD together with the sound data stored in the vehicular communication device VCD.

More specifically, an index number is attached to each sound data stored in the sound data storage of the vehicular communication device VCD. The signal sent from the stationary communication device SCD designates the index number of desired sound data. In response to this designation signal, the vehicular communication device VCD reads out the designated sound data from the sound data storage referring to the index number.

Figure 20:
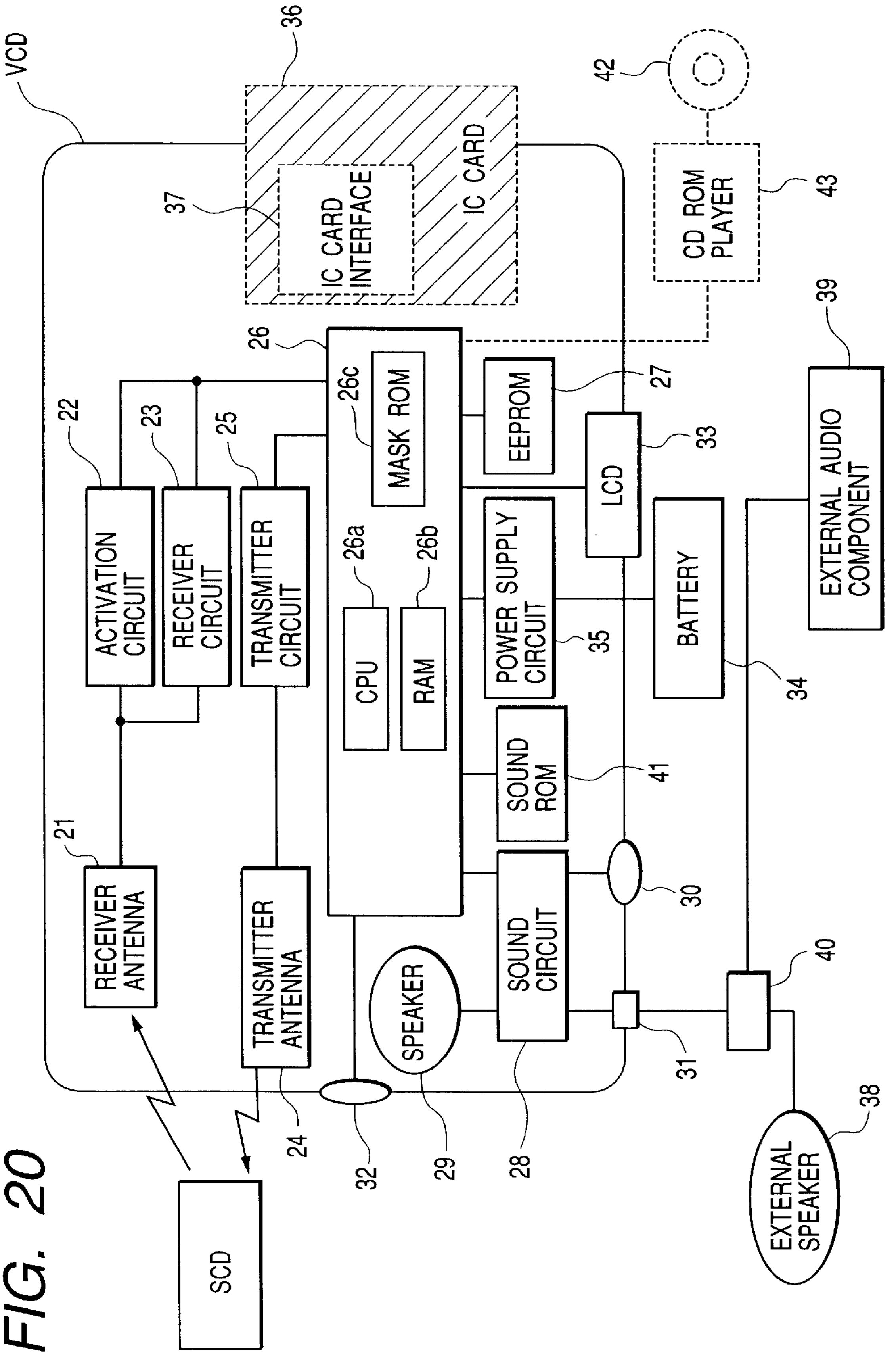
FIG. 20 is a schematic block diagram showing an arrangement of a vehicular communication device in accordance with a second embodiment of the present invention.

FIG. 20 shows a detailed arrangement of the vehicular communication device VCD in accordance with the second embodiment. A sound ROM 41, serving as the sound data storage, is additionally provided in the vehicular communication device VCD. When an index number designation signal arrives from the stationary communication device SCD, the CPU 26*a* reads the sound data corresponding to the designated index number from the sound ROM 41. The RAM 26*b* stores the readout sound data together with other sound data.

Another sound data storage is CD-ROM 42 whose sound data is read out by a CD-ROM player 43 activated in response to a signal fed from the control circuit 26. If necessary, the sound ROM 41 can be replaced by CD-ROM 42. Needless to say, both the sound ROM 41 and CD-ROM player 43 are installed in the vehicular communication device VCD.

The sound ROM 41 (or CD-ROM 42) stores frequently or commonly used guidance information, such as "accident ahead", "beware of congestion", "00 km to exit", together with their index numbers. For example, the stationary communication device SCD transmits sound data of "xx toll gate, 1 km ahead" together with an index number designation signal corresponding to "beware of congestion." The vehicular communication device VCD temporarily stores the sound data of "xx toll gate, 1 km ahead" in the RAM 26*b*. Meanwhile, the sound data of "beware of congestion" is read out from the sound ROM 41 (or CD-ROM 42) with reference to the designated index number, and stored in the RAM 26*b*. Then, the sound circuit 28 reads out all of the sound data stored in the RAM 26*b* and combine the readout sound data to issue a sound guidance, such as "xx toll gate, 1 km ahead, beware of congestion", through the built-in speaker 29 (or external speaker 38).

In this manner, by providing the sound data storage in the vehicular communication device VCD for storing frequently or commonly used sound data, some of sound data necessary for a sound guidance can be prepared by the vehicular communication device VCD. This effectively reduces the total amount of sound data transmitted from the stationary communication device SCD.

The second embodiment is identical with the first embodiment in that the sound data transmission from the stationary communication device SCD is performed by using a plurality of separate communication frames.

Third Embodiment

The third embodiment is characterized by a display of sound guidance realized on the LCD 33.

According to this embodiment, every divided sound data block is paired with corresponding display data and transmitted from the stationary communication device SCD. Thus, even if the vehicular communication device VCD fails to receive some of the sound data blocks, the user can get the necessary information through the display on the LCD 30.

When the vehicular communication device VCD fails to receive all of transmitted the sound data, it is possible to selectively issue a sound guidance and/or a display guidance according to an analysis on the received sound data. For example, in the missing sound data acquiring processing shown in FIG. 19, it is possible to set "k" as a data number of missing sound data blocks. The vehicular communication device VCD may exit the communication area formed by the stationary communication device SCD before the received sound data number reaches the preset data number "k." Furthermore, a predetermined communication time may expire. The vehicular communication device VCD cannot communicate with the stationary communication device SCD. In such a case, the already received sound data are analyzed and, the sound guidance and/or display guidance can be selectively issued based on the result of analysis.

The application of the communication system in accordance with the present invention is not limited to the automatic toll collection system. For example, the present invention can be applied to a drive-through system employed in a first food shop. The present invention is accordingly applied to any other communication system in which radio communications are performed between a stationary communication device and any type of mobile communication device.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A communication system comprising:

a stationary communication device placed at a predetermined position and forming a communication area covering vehicles traveling on a road; and at least one vehicular communication device mounted on a vehicle for communicating with said stationary communication device when said vehicle enters said communication area;

wherein said stationary communication device allocates an individual communication slot to each vehicular communication device in the communication area equivalent to a width of said road to perform one-to-one communication, divides sound guidance data into a plurality of sound data blocks of predetermined communication frames, assigns sequential numbers for each respective divided sound data block, and transmits said divided sound data blocks along with said assigned sequential numbers successively using said individual communication slots;

wherein said at least one vehicular communication device receives said divided sound data blocks and said assigned sequential numbers transmitted from said stationary communication device using said individual communication slots and, after accomplishing reception of all of said divided sound data blocks and said assigned sequential numbers, checks any failure in the data communication by checking whether any assigned sequential number of said divided sound data blocks is missing; and wherein only a vehicular communication device with a missing assigned sequential number of a sound data block requests said stationary communication device to retransmit only the specific sound data block that corresponds to said missing assigned sequential number when said check for missing assigned sequential numbers reveals said vehicular communication device failed to receive said specific sound data block, and thereafter issues a sound guidance using the received sound data blocks including said retransmitted specific sound data block.

2. The communication system in accordance with claim 1, wherein said vehicular communication device includes a sound data storage portion for storing a predetermined number of sound data beforehand, and said stationary communication device transmits a designation signal in addition to said divided sound data blocks so that said vehicular communication device reads particular sound data from said sound data storage portion in response to said designation signal.

3. The communication system in accordance with claim 2, wherein an index number is attached to each sound data stored in said sound data storage means of said vehicular communication device, and said stationary communication device transmits the designation signal including an index number corresponding to said particular sound data.

4. The communication system in accordance with claim 2, wherein said sound data storage portion of said vehicular communication device stores frequently or commonly used sound guidance information.

5. The communication system in accordance with claim 1, wherein said stationary communication device transmits display data paired with corresponding sound data blocks, and said vehicular communication device comprises a display unit for displaying contents of said sound data blocks based on said display data paired with said sound data blocks.

6. The communication system in accordance with claim 1, wherein said stationary communication device and said vehicular communication device comprise a bandwidth limiting circuit which limits a frequency band of communication data for modulating a carrier wave used in radio communications performed between said stationary communication device and said vehicular communication device.

7. The communication system in accordance with claim 6, wherein said bandwidth limiting circuit converts a rectangular waveform signal of digital communication data into a sine waveform signal.

8. The communication system in accordance with claim 1, wherein sound data are compressed by sampling characteristic points together with corresponding time information to create a polynomial representing a time variation of said sound data.

9. The communication system in accordance with claim 1, wherein a plurality of phonemes are prepared beforehand and a sound is created by multiplying respective phonemes with appropriate parameters and adding the multiplied phonemes.

10. A vehicular communication device mounted on a vehicle for communicating with a stationary communication device which allocates an individual communication slot to each vehicular communication device in a communication area equivalent to a width of a road on which said vehicle travels to perform one-to-one communication, said vehicular communication device comprising:

a receiving portion for receiving divided sound data blocks and corresponding sequential numbers successively transmitted from said stationary communication device specifically to said vehicular communication device;

a checking portion for checking any failure in the data communication by checking whether any sequential numbers corresponding to said divided sound data blocks are missing, after accomplishing reception of all of said divided sound data blocks and said corresponding sequential numbers;

a requesting portion for requesting said stationary communication device to retransmit specifically to said vehicular communication device only specific sound data blocks corresponding to any sequential numbers found to be missing only when said checking portion indicates that said specific sound data blocks were not received successfully; and a sound-generating portion for generating sound guidance in a compartment of the vehicle based on the received sound data blocks, including said specific retransmitted sound data blocks.

11. The vehicular communication device in accordance with claim 10, further comprising a temporary data storage portion for temporarily storing said divided sound data blocks successively transmitted from said stationary communication device, and said sound generating portion issues said sound based on said sound data blocks stored in said temporary data storage portion.

12. The vehicular communication device in accordance with claim 11, wherein said sound generating portion reissues said sound based on said sound data blocks stored in said temporary data storage portion.

13. The vehicular communication device in accordance with claim 10, further comprising a sound output terminal connectable to an external speaker provided in the compartment of the vehicle.

14. The vehicular communication device in accordance with claim 13, wherein a built-in speaker of said vehicular communication device causes no sound when said external speaker is connected to said sound output terminal.

15. The vehicular communication device in accordance with claim 13, wherein said external speaker is a speaker of an external audio component.

16. The vehicular communication device in accordance with claim 15, wherein a sound output switcher is provided between said sound output terminal and said external audio component for selecting sound data sent to said external speaker.

17. The vehicular communication device in accordance with claim 16, wherein said sound output switcher comprises:

a sound signal detecting circuit for detecting a sound signal generated from said sound output terminal; and a switching unit for supplying said sound signal to said external speaker when said sound signal detecting circuit detects said sound signal.

18. The vehicular communication device in accordance with claim 15, wherein a sound signal sent from said sound output terminal to said external speaker is larger than a sound signal sent from said external audio component to said external speaker.

19. The vehicular communication device according to claim 10, wherein a sound repeat button is provided to reissue the sound guidance when said sound repeat button is depressed by a user.

20. A communication system comprising:

a stationary communication device placed at a predetermined position and forming a communication area covering vehicles traveling on a road; and at least one vehicular communication device mounted on a vehicle for communicating with said stationary communication device when said vehicle enters in said communication area;

wherein said stationary communication device divides sound guidance data into a plurality of sound data blocks of predetermined communication frames and transmits said divided sound data blocks successively;

said vehicular communication device receives said divided sound data blocks transmitted from said stationary communication device, and requests said stationary communication device to retransmit specific sound data block when said vehicular communication device failed to receive said specific sound data block, thereby issuing a sound guidance using the received sound data blocks including said retransmitted specific sound data block;

said stationary communication device transmits display data paired with corresponding sound data blocks, and said vehicular communication device comprises a display unit for displaying contents of said sound data blocks based on said display data paired with said sound data blocks; and said vehicular communication device analyzes missing sound data based on received sound data and selectively issues one of a sound guidance and a display guidance in accordance with the analysis.

21. The communication system in accordance with claim 20, wherein said vehicular communication device includes a sound data storage portion for storing a predetermined number of sound data blocks, and said stationary communication device transmits said divided sound data blocks and a designation signal designating particular sound data blocks stored in said sound data storage portion so that said vehicular communication device reads said divided sound data blocks in combination with said particular sound data blocks from said sound data storage portion.

22. The communication system in accordance with claim 21, wherein an index number is attached to each sound data block stored in said sound data storage portion of said vehicular communication device, and said stationary communication device transmits said designation signal including an index number corresponding to said particular sound data block.

23. The communication system in accordance with claim 21, wherein said sound data storage portion of said vehicular communication device stores frequently or commonly used sound guidance information.

24. The communication system in accordance with claim 20, wherein each of said stationary communication device and said vehicular communication device comprises a bandwidth limiting circuit which limits a frequency band of communication data for modulating a carrier wave used in radio communications performed between said stationary communication device and said vehicular communication device.

25. The communication system in accordance with claim 24, wherein said bandwidth limiting circuit converts a rectangular waveform signal of digital communication data into a sine waveform signal.

26. The communication system in accordance with claim 20, wherein said vehicular communication device comprises 1) a receiving portion for receiving said divided sound data blocks and corresponding sequential numbers successively transmitted from said stationary communication device; 2) a checking portion for checking whether any sequential numbers corresponding to said sound data blocks are missing; 3) a requesting portion for requesting said stationary communication device to retransmit specific sound data blocks corresponding to any sequential numbers found to be missing when said checking portion indicates that said specific sound data blocks were not received successfully; and a 4) sound-generating portion for generating said sound guidance in a compartment of the vehicle based on the received sound data blocks, including said specific restransmitted sound data blocks.

27. The communication system in accordance with claim 26, wherein the vehicular communication device further comprises a temporary data storage portion for temporarily storing said divided sound data blocks successively transmitted from said stationary communication device, and said sound-generating portion issues said sound guidance based on said temporarily stored sound data blocks in said temporary data storage portion.

28. The communication system in accordance with claim 27, wherein said sound-generating portion of said vehicular communication device reissues said sound guidance based on said temporarily stored sound data blocks in said temporary data storage portion.

29. The communication system in accordance with claim 26, wherein said vehicular communication device further comprises a sound output terminal connectable to an external speaker provided in the compartment of the vehicle.

30. The communication system in accordance with claim 29, wherein said vehicular communication device further comprises a built-in speaker that does not generate sound when said external speaker is connected to said sound output terminal.

31. The communication system in accordance with claim 29, wherein said external speaker is a speaker of an external audio component.

32. The communication system in accordance with claim 31, wherein a sound output switcher is provided between said sound output terminal and said external audio component for selecting sound data sent to said external speaker.

33. The communication system in accordance with claim 32, wherein said sound output switcher comprises:

a sound signal detecting circuit for detecting a sound signal generated from said sound output terminal; and a switching unit for supplying said sound signal to said external speaker when said sound signal detecting circuit detects said sound signal.

34. The communication system in accordance with claim 31, wherein a sound signal sent from said sound output terminal to said external speaker is larger than a sound signal sent from said external audio component to said external speaker.

35. The communication system in accordance with claim 26, wherein said vehicular communication device further comprises a sound repeat button to reissue the sound guidance when said sound repeat button is depressed by a user.

36. The communication system in accordance with claim 20, wherein said stationary communication device comprises:

a sound data transmitting portion for 1) dividing said sound guidance data into said sound data blocks of predetermined communication frames; 2) assigning sequential numbers to respective sound data blocks; and 3) transmitting said divided sound data blocks, together with their sequential numbers, successively to said vehicular communication device; and missing data retransmitting means for retransmitting said specific sound data block in response to said request from said vehicular communication device when said vehicular communication device determines that said vehicular communication device has failed to receive said specific sound data block.

37. The communication system in accordance with claim 20, wherein sound data are compressed by sampling characteristic points together with corresponding time information to create a polynomial representing a time variation of said sound data.

38. The communication system in accordance with claim 20, wherein a plurality of phonemes are prepared in advance and a sound is created by multiplying respective phonemes with appropriate parameters and adding the multiplied phonemes.

39. A communication system comprising:

a stationary communication device placed at a predetermined position and forming a communication area to transmit first sound data blocks to a specific vehicle traveling on a road; and at least one vehicular communication device mounted on said specific vehicle for receiving the first sound data blocks transmitted from said stationary communication device when said vehicle enters said communication area;

wherein said vehicular communication device includes a sound data storage portion for storing a predetermined number of pre-defined second sound data blocks along with corresponding index numbers;

wherein said stationary communication device allocates an individual communication slot to each vehicular communication device in the communication area equivalent to a width of said road to perform one-to-one communication and transmits said first sound data blocks and a designation signal designating index numbers corresponding to particular ones of said second sound data blocks stored in said sound data storage portion; and wherein said vehicular communication device reads said particular ones of said second sound data blocks corresponding to said index numbers from said sound data storage portion in response to said designation signal and generates a sound guidance by combining said particular ones of said second sound data blocks read from said sound data storage portion with the first sound data blocks received from said stationary communication device.

40. The communication system in accordance with claim 39, wherein said sound data storage potion of said vehicular communication device stores frequently or commonly used sound guidance information.

* * * * *